(12) United States Patent
Ookuma

(10) Patent No.: US 8,370,384 B2
(45) Date of Patent: Feb. 5, 2013

(54) INFORMATION PROCESSING APPARATUS, FILE MANAGEMENT METHOD, PROGRAM, AND STORAGE MEDIUM

(75) Inventor: Satoshi Ookuma, Yokohama (JP)

(73) Assignee: Canon Kabushiki Kaisha (JP)

( * ) Notice: Subject to any disclaimer, the term of this patent is extended or adjusted under 35 U.S.C. 154(b) by 152 days.

(21) Appl. No.: 12/680,084

(22) PCT Filed: Sep. 12, 2008

(86) PCT No.: PCT/JP2008/066931
§ 371 (c)(1),
(2), (4) Date: Mar. 25, 2010

(87) PCT Pub. No.: WO2009/041351
PCT Pub. Date: Apr. 2, 2009

(65) Prior Publication Data
US 2011/0270865 A1 Nov. 3, 2011

(30) Foreign Application Priority Data

Sep. 25, 2007 (JP) .................................. 2007-247221

(51) Int. Cl.
*G06F 17/30* (2006.01)
(52) U.S. Cl. ........................................................ 707/769
(58) Field of Classification Search .................. 707/769
See application file for complete search history.

(56) References Cited

U.S. PATENT DOCUMENTS

| | | | |
|---|---|---|---|
| 5,050,071 A * | 9/1991 | Harris et al. ........................... | 1/1 |
| 5,544,360 A * | 8/1996 | Lewak et al. ......................... | 1/1 |
| 6,014,677 A | 1/2000 | Hayashi et al. | |
| 2001/0027451 A1 * | 10/2001 | Taguchi et al. ................... | 707/3 |
| 2003/0117651 A1 | 6/2003 | Matraszek et al. | |
| 2006/0224581 A1 * | 10/2006 | Sasai ................................. | 707/5 |
| 2009/0059261 A1 * | 3/2009 | Sato ............................. | 358/1.13 |

FOREIGN PATENT DOCUMENTS

| | | |
|---|---|---|
| EP | 0 749 077 A2 | 12/1996 |
| JP | 5-233703 A | 9/1993 |
| JP | 08-106468 A | 4/1996 |
| JP | 10-254886 A | 9/1998 |
| JP | 2004-206654 A | 7/2004 |
| JP | 2006-065501 A | 3/2006 |

OTHER PUBLICATIONS

International Search Report issued in related PCT/JP2008/086931, mailed Oct. 14, 2008.
JP Office Action issued Oct. 29, 2012 for corresponding JP2007-247221.

* cited by examiner

*Primary Examiner* — Sheree Brown
(74) *Attorney, Agent, or Firm* — Rossi, Kimms & McDowell LLP

(57) ABSTRACT

An image processing apparatus which is capable of improving user's convenience in searching for documents once found by a previous search, again. A CPU of the apparatus accepts the entry of a search keyword from the user, and obtains user information for identifying the user. The CPU adds the input search keyword to an index information item contained in each of document data items in association with the user information, and stores the index information item having the search keyword added thereto in an HDD, together with the document data item.

15 Claims, 16 Drawing Sheets

INFORMATION PROCESSING APPARATUS, FILE MANAGEMENT METHOD, PROGRAM, AND STORAGE MEDIUM

This application is a U.S. National Phase Application of PCT International Application PCT/JP2008/066931 filed on Sep. 12, 2008 which is based on and claims priority from JP 2007-247221 filed on Sep. 25, 2007 the contents of which is incorporated herein in its entirety by reference.

TECHNICAL FIELD

The present invention relates to an information processing apparatus that is capable of managing files efficiently, a file management method, a program, and a storage medium.

BACKGROUND ART

The databases that store documents include a document database that stores indexes associated with images of the respective documents so as to improve the convenience of searching for a document or documents. Normally, each index holds the title, creator, date of update, and so forth, of a document with which the index is associated. The user can search information (index information) held in the indexes, and obtain desired document images based on index information found by the search. In recent years, some indexes hold, as index information, histories of updates, information on owners, information on access restrictions, etc. of documents.

An index is added when a copying machine having a printer function prints a document stored in a storage of the copying machine or a document stored in a personal computer connected to the copying machine via a network. Further, an index is also added when a document on a sheet medium is read using a scanner, and is stored as image data in the storage of the copying machine.

In the document database storing a large amount of documents, even when the user uses index information to search for a desired document, it is difficult to obtain the desired document in a single search operation by using the index information alone. In many cases, the user searches for the desired document as a target by repeatedly narrowing down the search, performing the search on a trial and error basis a plurality of times, and/or browsing each of documents found by the search one by one to see if it is the desired one.

Further, users sometimes wish to search for one or a plurality of documents found by a previous search as mentioned above, again from the database. In this case, it is necessary to perform complicated operations for narrowing down the search, as performed on the previous occasion, again, and hence the operations are very troublesome. To eliminate this inconvenience, Japanese Patent Laid-Open Publication No. H05-233703 proposes a technique which enables a user to add a new search keyword, for registration, to search keywords added to document image data. This enables the user to add a keyword or keywords of his own selection to document image data, whereby it is made easier for the user to find the desired document(s) again by a search using the keyword(s).

However, when the user searches the document database for a document or documents which he/she found by a previous search, again, the user often performs complicated operations for narrowing down the search, and/or repeatedly performing the search on a trial and error basis, as performed on the previous occasion, as mentioned above. On the other hand, in a case where the user desires to use a document found by a search on a previous occasion, there is a problem that a copy obtained by locally retrieving the document from the database cannot have updates made to the original document in the database reflected thereon, so that an old version of the document is used as it is.

Further, in a case where a document found by a search performed on a previous occasion is accessed again based on information on the search stored in the database, there is a problem that if a storage position of the document has been changed by an owner of the document, it is impossible to access the document based on the information stored in the database. As described above, when a document or documents is/are searched for again, there is a high possibility that it is required to perform complicated search operations, which impairs user's convenience.

Furthermore, in a case where the user adds a search keyword to document image data for additional registration, if another user happens to add the same search keyword to another document, it is impossible for the user to obtain the same result as obtained by the search performed on the previous occasion. This compels the user to give consideration to a search keyword to be added to a document such that the search keyword is the same as one added to other documents by another user. This reduces the degree of freedom of setting keywords, which also impairs user's convenience.

DISCLOSURE OF THE INVENTION

The present invention provides an information processing apparatus which is capable of improving user's convenience in searching for files (documents) once found by a previous search, again, a file management method, a program, and a storage medium.

In a first aspect of the present invention, there is provided an information processing apparatus comprising an input unit configured to input a search key, a user information obtaining unit configured to obtain user information for identifying a user, an addition unit configured to add the search key input by the input unit to index information associated with a file in association with the user information obtained by the user information obtaining unit, and a storage control unit configured to cause the index information having the search key added thereto by the addition unit to be stored in a storage unit, together with the file.

In a second aspect of the present invention, there is provided a file management method comprising an input step of inputting a search key, a user information obtaining step of obtaining user information for identifying a user, an addition step of adding the search key input in the input step to index information associated with a file in association with the user information obtained in the user information obtaining step, and a storage control step of causing the index information having the search key added thereto in the addition step to be stored in a storage unit, together with the file.

In a third aspect of the present invention, there is provided a program for causing a computer to execute a file management method, wherein the file management method comprises wherein the file management method comprises an input step of inputting a search key, a user information obtaining step of obtaining user information for identifying a user, an addition step of adding the search key input in the input step to index information associated with a file in association with the user information obtained in the user information obtaining step, and a storage control step of causing the index information having the search key added thereto in the addition step to be stored in a storage unit, together with the file.

In a fourth aspect of the present invention, there is provided a computer-readable storage medium storing a program for causing a computer to execute a file management method, wherein the file management method comprises an input step of inputting a search key, a user information obtaining step of obtaining user information for identifying a user, an addition step of adding the search key input in the input step to index information associated with a file in association with the user information obtained in the user information obtaining step, and a storage control step of causing the index information having the search key added thereto in the addition step to be stored in a storage unit, together with the file.

According to the present invention, an input search key is added to index information associated with a file in association with obtained user information. This makes it possible to uniquely search for the file associated with the index information to which the user has added the keyword, without being affected by a keyword added to index information of other files by other users. As a consequence, it is possible to improve user's convenience in searching for the file again.

Further features and aspects of the present invention will become apparent from the following detailed description of exemplary embodiments with reference to the attached drawings.

BEST MODE FOR CARRYING OUT THE INVENTION

The following description of various exemplary embodiments, features, and aspects of the present invention is merely illustrative in nature and is in no way intended to limit the invention, its application, or uses.

Hereinafter, embodiments of the present invention will be described in detail with reference to the drawings.

Figure 1:
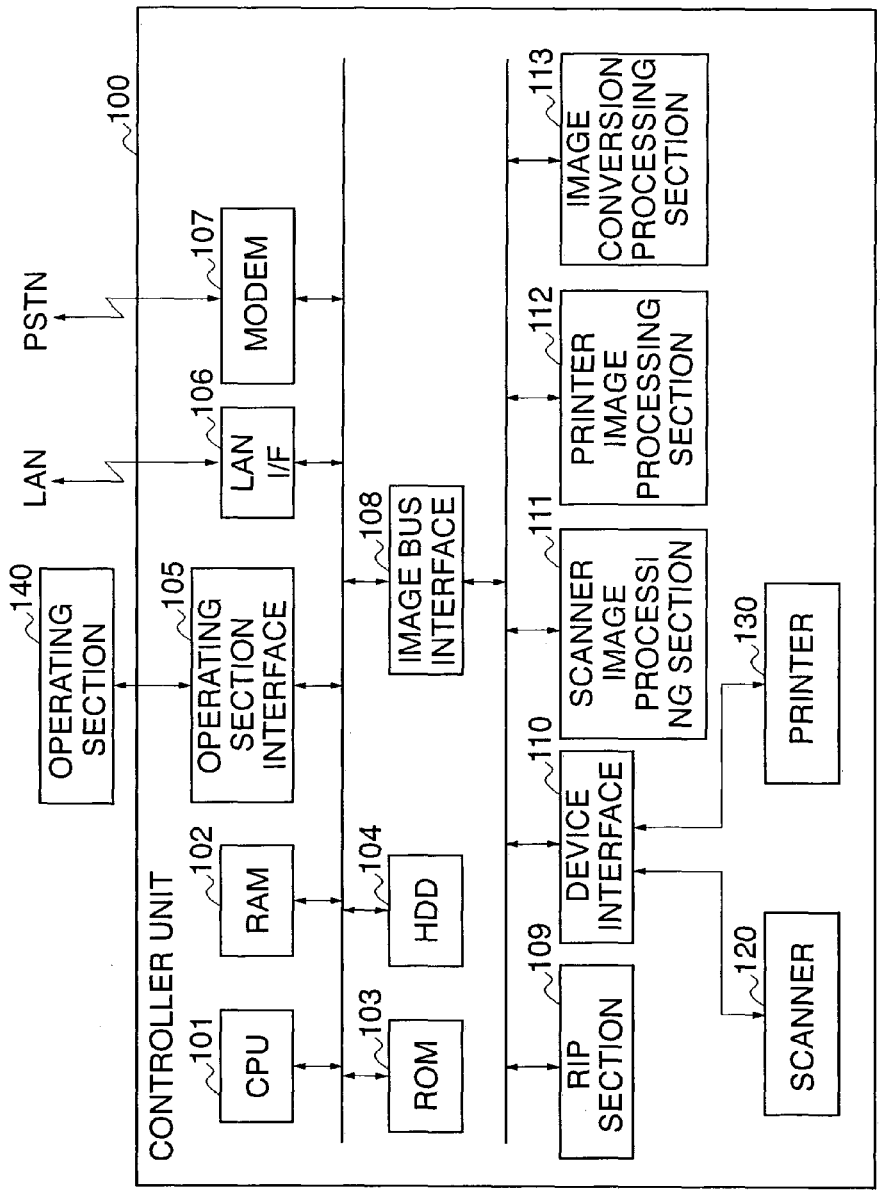
FIG. 1 is a system block diagram showing the internal configuration of an image processing apparatus as an information processing apparatus according to a first embodiment of the present invention.

FIG. 1 is a system block diagram showing the internal configuration of an image processing apparatus as an information processing apparatus according to a first embodiment of the present invention.

The image processing apparatus includes a controller unit 100. The controller unit 100 is connected to a scanner 120 as an image input device and a printer 130 as an image output device. Further, the controller unit 100 can be connected to a LAN (Local Area Network) and a PSTN (Public Switched Telephone Networks).

Further, the controller unit 100 has a CPU 101 that executes various kinds of control programs. The CPU 101 starts the system based on a boot program stored in a ROM 103, and while operating along with the system, the controller unit 100 reads control programs stored in a HDD (Hard Disk Drive) 104, and executes predetermined processes using a RAM 102 as a work area.

The HDD 104 stores the above-mentioned control programs and document data (image data). The document data stored in the HDD 104 is obtained by reading documents by the scanner 120, or obtained from other devices via a LAN interface 106 and a modem 107. Items of the document data are each comprised of an item of document image data 602, referred to hereinafter, showing images of a document, and an item of index information 601, referred to hereinafter, added to the document image data. Each item of the index information 601 is associated one-to-one with an item of document data, and holds various kinds of information concerning the associated document data item.

An operating section interface 105 provides interface with an operating section 140, and transfers document data to be displayed on the operating section 140 thereto, and a signal generated by an inputting operation via the operating section 140 to the CPU 101.

The operating section 140 includes a display section for displaying current settings of functions concerning image processing, and an information input screen for inputting configuration information on functions of the image processing apparatus, and an input section including e.g. keys via which a user inputs configuration information on the functions.

The LAN interface 106 is connected to the LAN, and inputs and outputs information via the LAN. The modem 107 is connected to the PSTN, and inputs and outputs information via the PSTN. An image bus interface 108 provides interface for connecting between an image bus 150 and a system bus 160, and converting one of respective data structures of data transferred in the two buses into the other or vice versa. A RIP section 109 forms PDL (Page Description Language) code into a bitmap image. A device interface 110 connects the scanner 120 and the printer 130 to the controller unit 100, to perform synchronous-to-asynchronous or asynchronous-to-synchronous conversion of document data.

A scanner image processing section 111 performs correction, modification, and editing on input document data. A printer image processing section 112 performs image correction on document data for printout in a manner adapted to the printer 130. An image conversion processing section 113 performs rotation processing, resolution correction, binary-/multivalue conversion, and/or the like processing, on document data.

Figure 2:
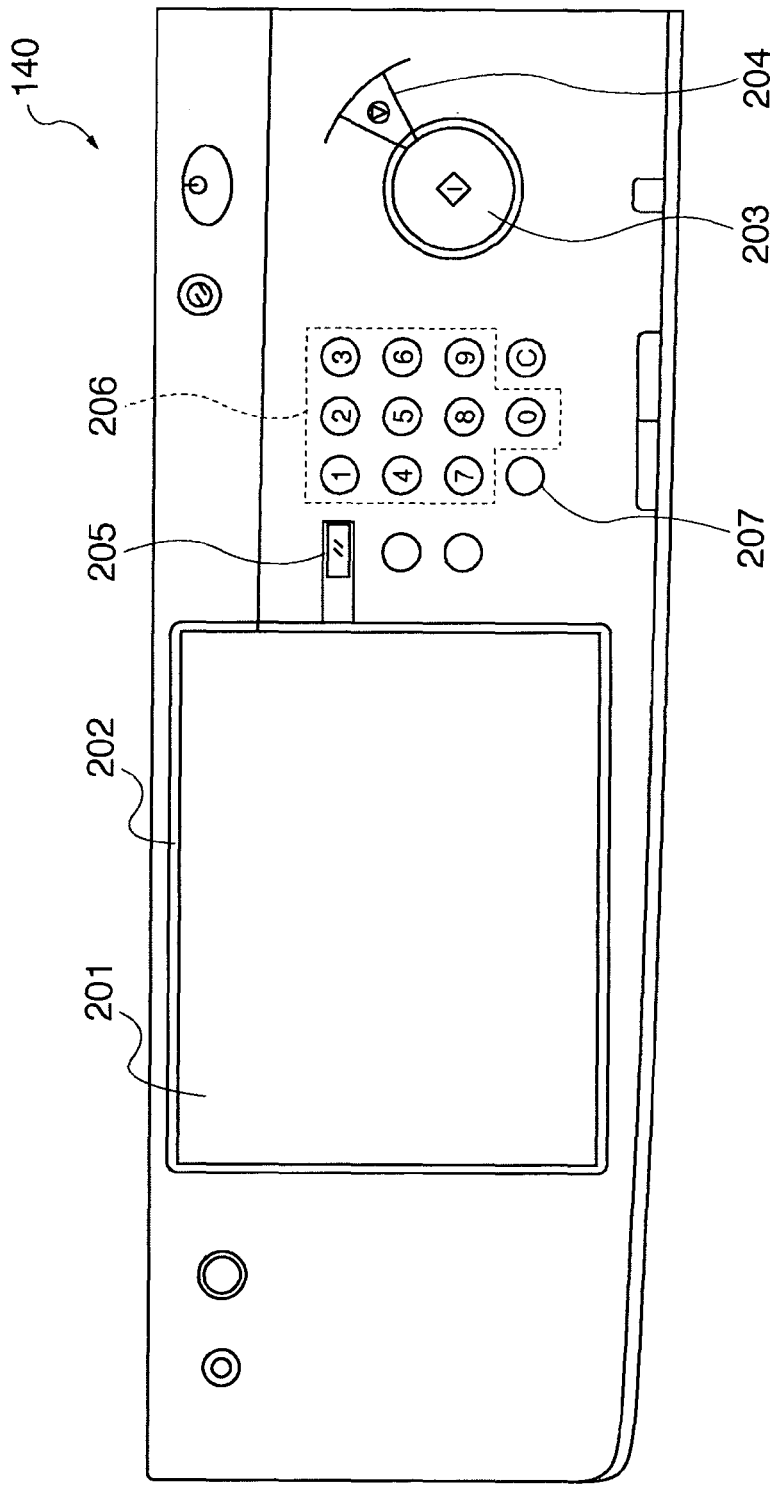
FIG. 2 is a view of the appearance of an operating section of the image processing apparatus shown in FIG. 1.

FIG. 2 is a view of the appearance of the operating section 140 of the image processing apparatus shown in FIG. 1. A liquid-crystal operation panel section 202 is a liquid crystal display device having a touch panel sheet 201 on a surface thereof, and displays operation screens for enabling the user to perform various settings, and input configuration information. The user can input instructions for performing various settings by touching respective displays of operational instructions displayed on the liquid-crystal operation panel section 202 via the touch panel sheet 201. When the user inputs an instruction using the touch panel, position information of a place touched by the user is detected to transmit corresponding contents of the instruction to the CPU 101 via the operating section interface 105.

A start key 203 is a hardware key for instructing the start of a reading operation by the scanner 120 or a printing operation by the printer 130. A stop key 204 is a hardware key for instructing the termination of each operation. A reset key 205 is for clearing a current setting to reset the same to a default value thereof.

A ten-key pad 206 is for inputting numerical values, such as the number of copies. An ID key 207 is for enabling the user to input a user ID, a group ID, referred to hereinafter, a password, or the like information, so as to log in to the image processing apparatus.

Figure 3:
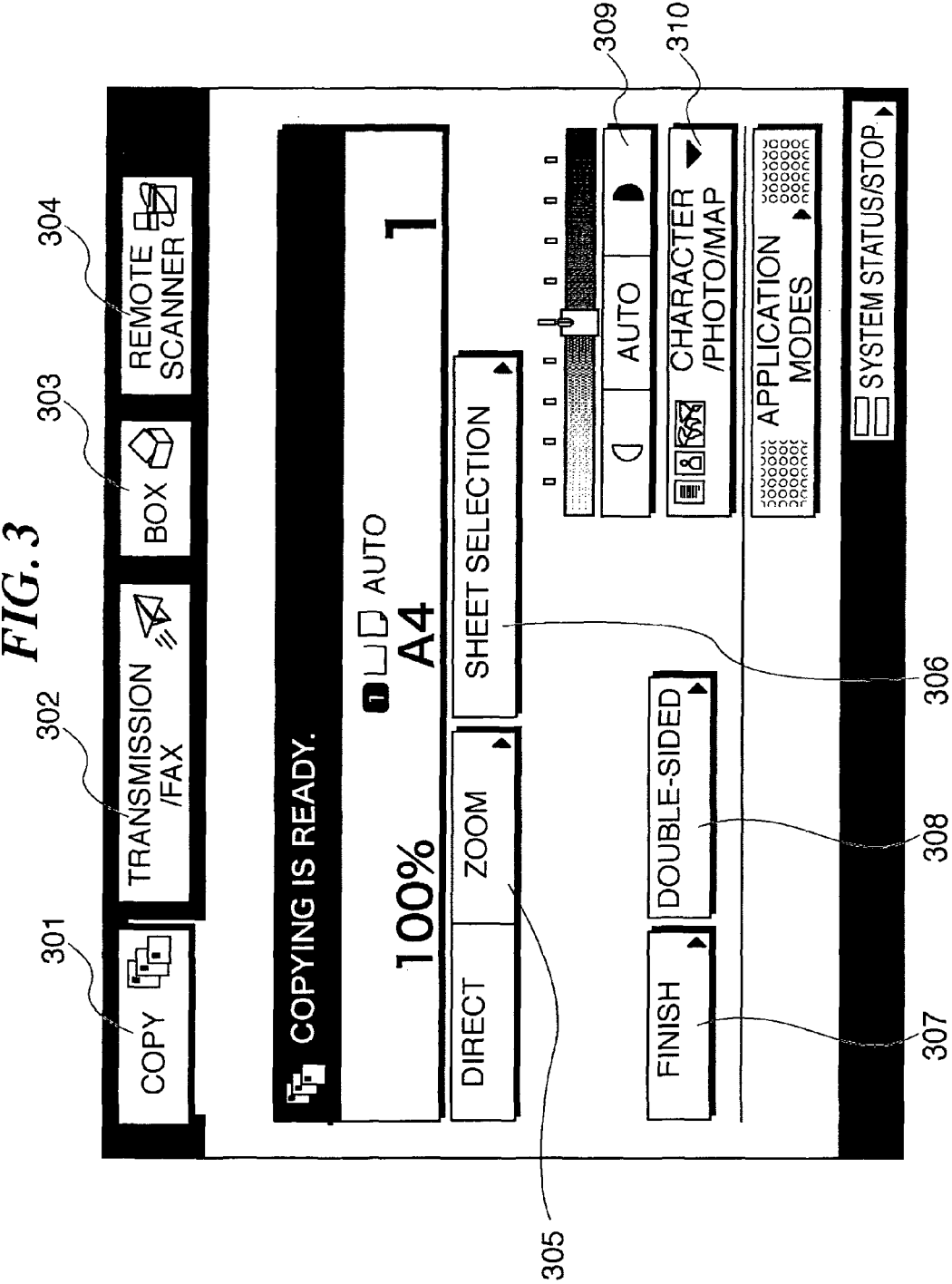
FIG. 3 is a diagram showing an example of an operation screen displayed on a liquid-crystal operation panel section of the operating section shown in FIG. 2.

FIG. 3 is a diagram showing an example of an operation screen displayed on the liquid-crystal operation panel section 202 of the operating section 140. The operation screen shown in FIG. 3 is a copy basic screen displayed as a default screen when the power of the image processing apparatus is turned on.

The image processing apparatus is provided with four modes, i.e. a copy mode, a transmission mode, a box mode, and a scanner mode. In the copy mode, a copying operation is performed in which an image on an original is read by the scanner 120, and is printed out by the printer 130. In the transmission mode, document data read by the scanner 120 or document data stored in advance in the HDD 104 is transmitted using a means, such as electronic mail, to a destination via the LAN or the Internet.

In the box mode, editing, printing, transmission, or the like processing is performed on document data stored in the HDD 104. The term "box" is intended to mean a storage area in the HDD 104 which is assigned to each user for storing document data. In the scanner mode, document data obtained by reading an image on an original by the scanner 120 is stored in the box, or is transmitted to another device via the LAN. Switching between the above-mentioned modes is performed by selecting one of the mode buttons 301 to 304.

FIG. 3 shows the copy basic screen in a state in which the copy mode is selected. The user uses buttons 305 to 310 for performing setting of enlargement/reduction, selection of a size of sheets for printout, sheet delivery specification selection, designation of double-sided/single-sided printing, density designation, and setting of an image quality mode.

When the box mode button 303 is selected, a box list screen, not shown, is displayed for displaying a list of information on the boxes assigned to respective users. When one of the boxes is selected from the list displayed on the box list screen, a document data list screen appearing in FIG. 4 is displayed.

Figure 4:
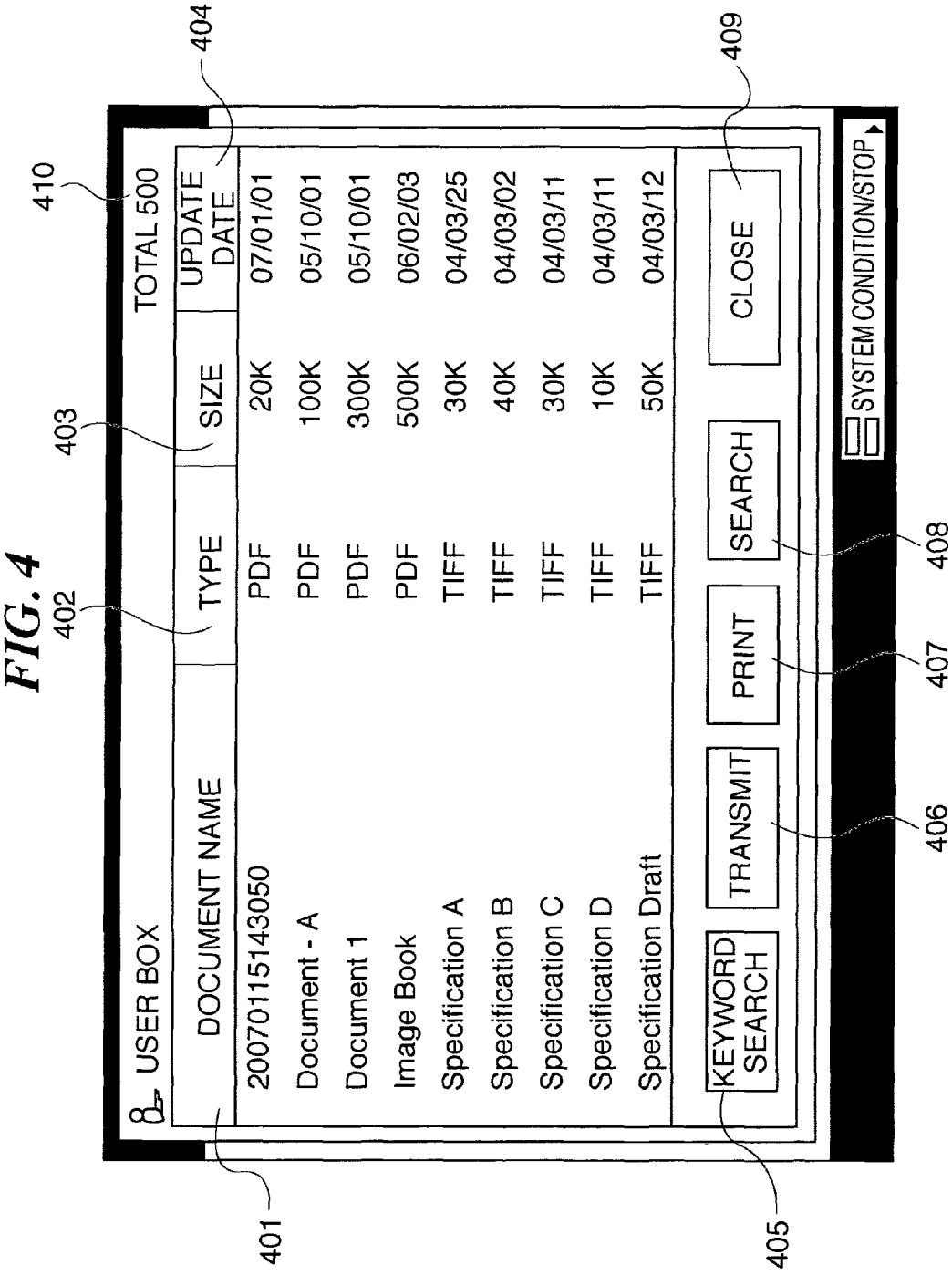
FIG. 4 is a diagram showing an example of a document data list screen displayed on the liquid-crystal operation panel section.

FIG. 4 is a diagram showing an example of the document data list screen displayed on the liquid-crystal operation panel section 202. The document data list screen displays a list of information on document data stored in the box selected on the box list screen.

As shown in FIG. 4, a document name display column 401 displays the respective names of document data items. A document type display column 402 displays information indicating the type (kind) of each document data item. A document size display column 403 displays the size of each document data item. An updated date display column 404 displays information indicating a date and time of last update of each document data item Further, a document count display column 410 displays the number of all the document data items to be displayed in the document data list. A keyword search button 405 is for displaying a keyword search designation screen for use in performing a keyword search.

The user can turn one or a plurality of document data items into a selected state by depressing desired one(s) of document data items in the displayed document data list. The image processing apparatus is capable of performing processing, such as transmission and printing, on the document data item(s) turned into the selected state.

A transmission button 406 is for displaying a screen for setting transmission processing on the selected document data items(s). A print button 407 is for displaying a screen for setting the printing of the selected document data (items).

A search button 408 is for displaying a search condition designation screen for use in searching for document data from the document data list under specific conditions. A close button 409 is for closing the document data list screen.

Figure 5:
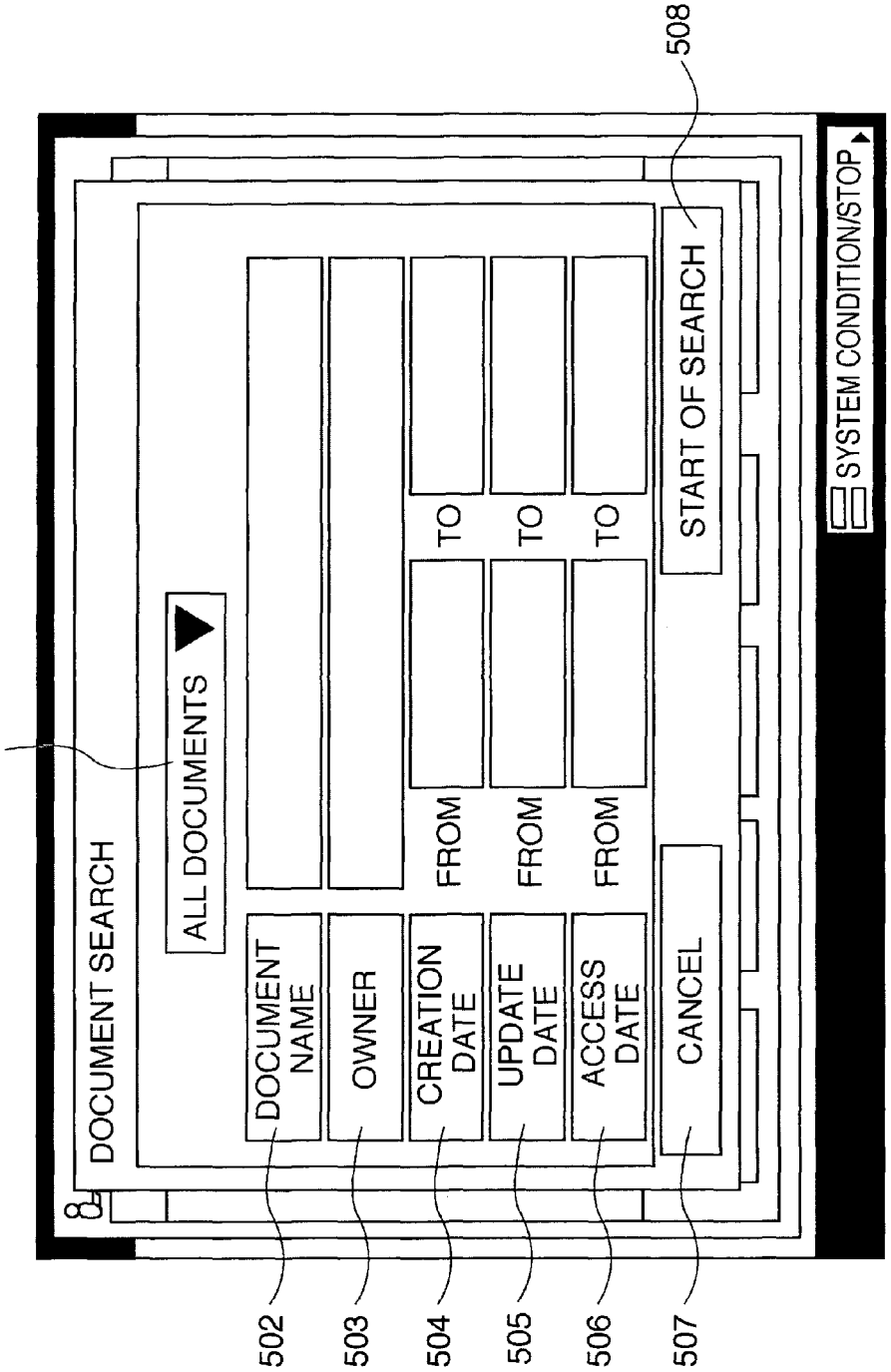
FIG. 5 is a diagram showing an example of a search condition designation screen displayed on the liquid-crystal operation panel section.

FIG. 5 is a diagram showing an example of the search condition designation screen displayed on the liquid-crystal operation panel section 202. The search condition designation screen is displayed when the search button 408 is depressed on the document data list screen shown in FIG. 4. It is possible to extract document data desired by the user from the document data displayed on the document data list screen by performing a search under various search conditions configured on the search condition designation screen.

A document type drop-down list 501 is for selecting the type of document data to be searched. A document name specification label 502 is for indicating a text box 502*a* where the document name of a document data item to searched for is entered. An owner specification label 503 is for indicating a text box 503*a* where the name of the owner or creator of the document data item to be searched for is entered.

Further, labels 504 to 506 are for indicating boxes 504*a* and 504*b*, 505*a* and 505*b*, and 506*a* and 506*b* for specifying time ranges (from when to when) during which the document data to be searched for was created, updated the last time, and accessed the last time, respectively. When a plurality of the above search conditions have been set, it is regarded that they have been set as AND conditions, and document data satisfying all the search conditions is searched for.

A search start button 508 is for actually executing a search for document data after inputting the search conditions via the document type drop-down list 501 and the text boxes associated with the respective labels 502 to 506. A cancel button 507 is for closing the search condition designation screen without performing the search.

Figure 6:
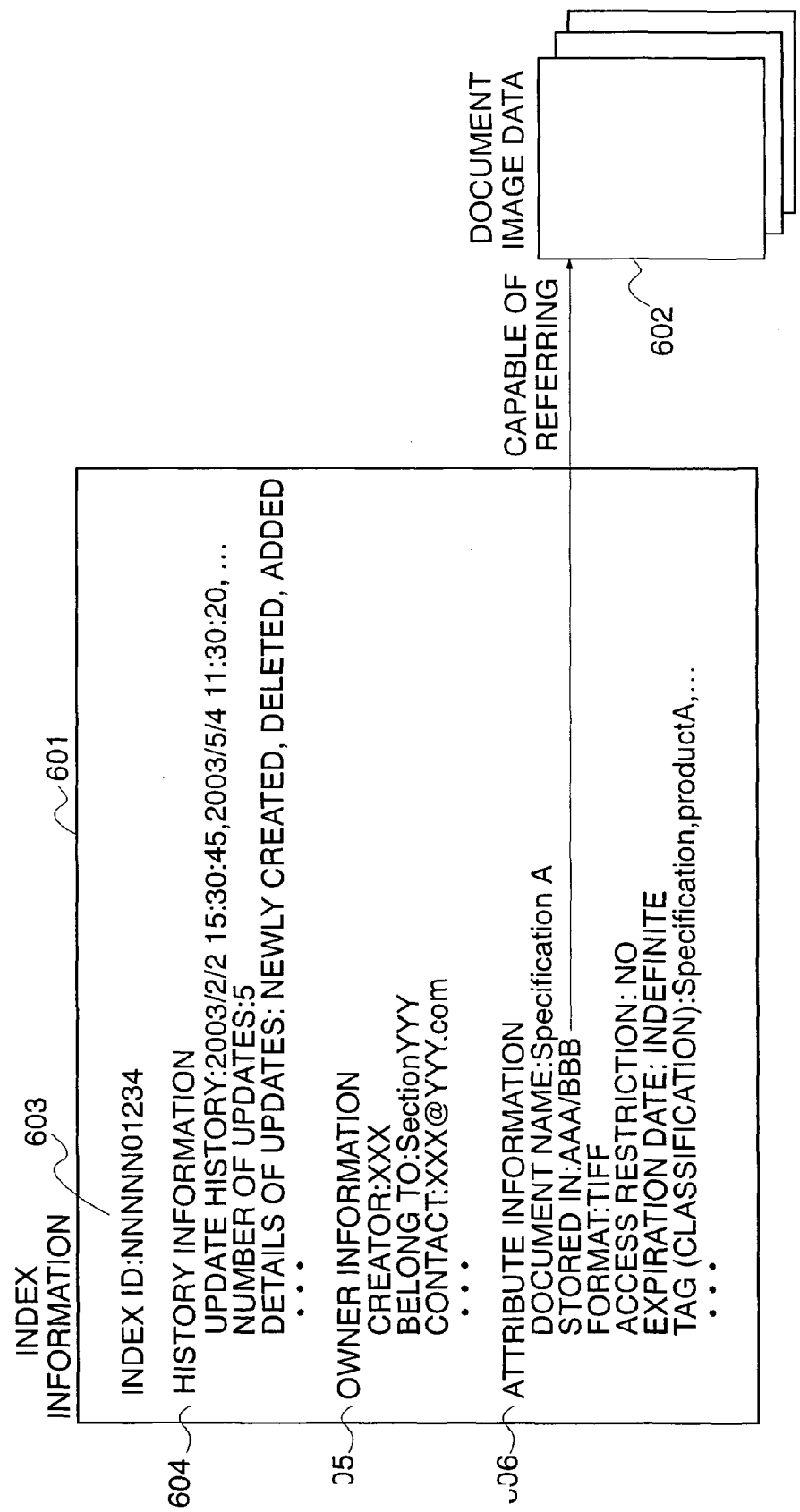
FIG. 6 is a conceptual view of the structure of an document data item stored in an HDD.

FIG. 6 is a conceptual view of the structure of document data stored in the HDD 104.

Each document data item is comprised of two parts, i.e. the index information 601 and the document image data 602. The document image data 602 is raster data, PDL data or the like data of images of a document itself.

The index information 601 is data that holds attribute information concerning document image data 602 associated therewith. The attribute information includes information on a link to the document image data 602 (a location where the document image data 602 is stored). This makes it possible to access the document image data itself based on the link information. Normally, the index information 601 and the document image data 602 are associated one-to-one with each other. An index ID 603 is an ID number for uniquely identifying the index information. The index information 601 mainly holds the following three types of data items:

History information 604 shows a history of updates made to the document image data 602 associated with the index information 601, and includes information e.g. on update dates of the document data, the number of updates, and details of updates. Owner information 605 is data concerning the owner of the document data item, and includes information e.g. on the name of the owner, the respective names of organizations and groups to which the owner belongs, contact addresses, such as a telephone number and an electronic mail address, of the owner. Attribute information 606 includes various items of information on the document data item. Examples of the items of the information on the document data item include the name of the document data item, a link to the document image data (a location where document image data is stored), the format of the document image data, access restriction information for identifying individuals and groups permitted to refer to the document image data, and the expiration date of the document data item.

Further, the attribute information 606 includes information items, such as a plurality of keywords as tags (classification) of the document data item. The tags of a document data item are formed by keywords concerning the contents, abstract, and classification of the document data item, and are used as a search vocabulary for use in searching for the document data item. It is possible to rewrite these contents of the index information 601 and add new contents thereto, as required.

Figure 7:
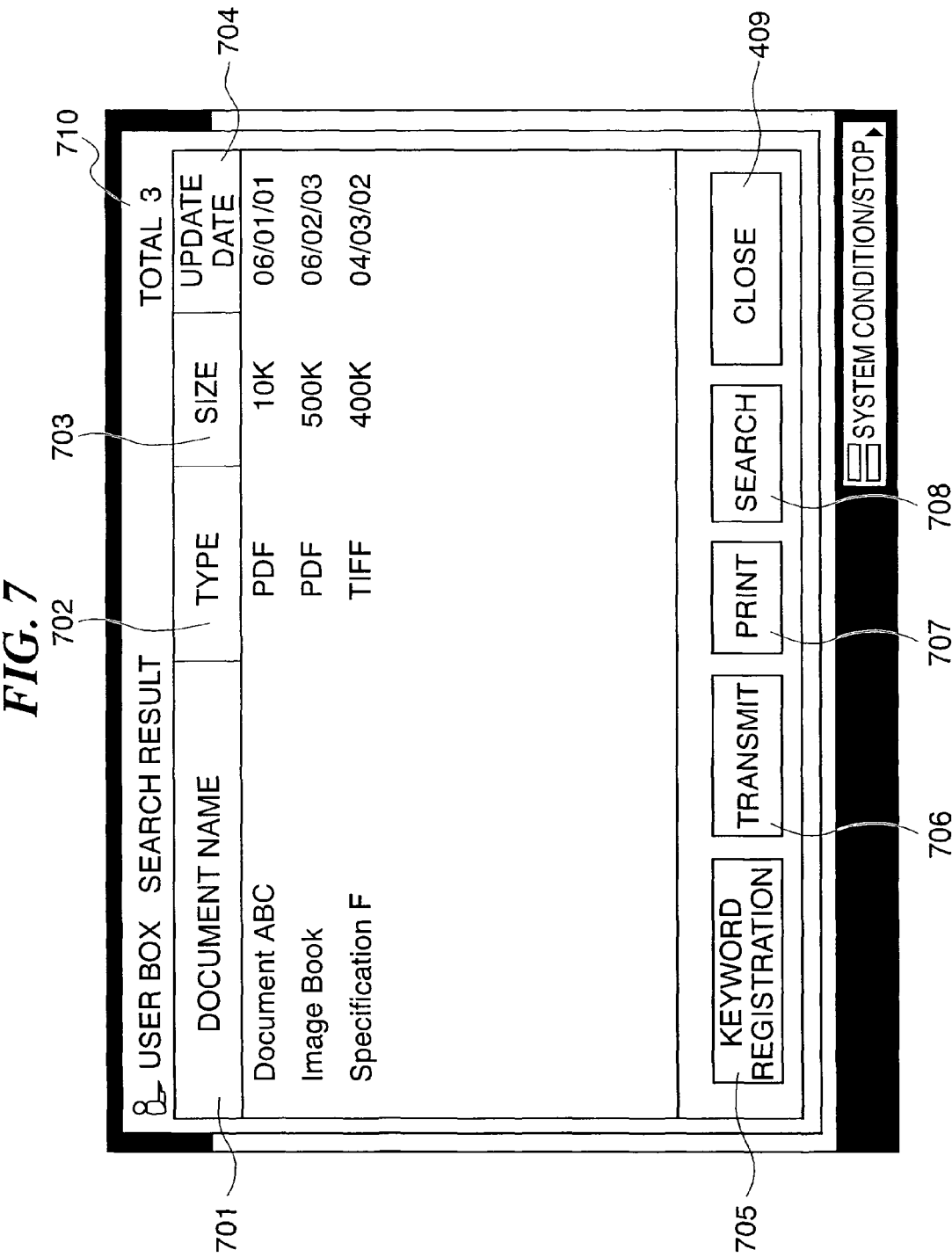
FIG. 7 is a diagram showing an example of a search result screen displayed on the liquid-crystal operation panel section.

FIG. 7 is a diagram showing an example of a search result screen displayed on the liquid-crystal operation panel section 202. The search result screen is displayed after search conditions are input on the search condition designation screen in FIG. 5 and then the search start button 508 is depressed.

A document name display column 701, a document type display column 702, a document size display column 703, and an update date display column 704 display the respective same kinds of information as displayed under the document name display column 401 to the update data display column 404 appearing in FIG. 4. Further, a count display column 710 displays the number of document data items obtained as a search result. In the illustrated example, the search result screen shows that three document data items having the respective document names of "Document ABC", "Image Book", and "Specification F" were found by the search.

The user can turn a desired one of the three document data items found by the search, into a selected state, similarly to the case of the document data list screen in FIG. 4. When a transmission button 706 or a print button 707 is depressed, the image processing apparatus performs processing, such as transmission to an external device and printing, on the document data items turned into the selected state.

Further, by depressing a search button 708, it is possible to narrow down the search result by further performing a search on these document data items. When the search result is narrowed down by repeatedly performing a search, as described above, there arises a demand for calling any of the search results obtained in the past with ease again. In this case, although it is necessary to narrow down the search using the same search conditions as used on a preceding occasion when the search result was obtained. However, when the search conditions are complicated or the search has to be repeatedly carried out a plurality of times, the process is very troublesome. To solve this problem, in the present embodiment, it is made possible to obtain the same search result next time, by adding a specific keyword to document data items obtained as a search result or a narrowed-down search result.

A keyword registration button 705 is for starting a process for registering (adding) a keyword desired by the user to the present search result. A close button 709 is for closing the search result screen.

Figure 8:
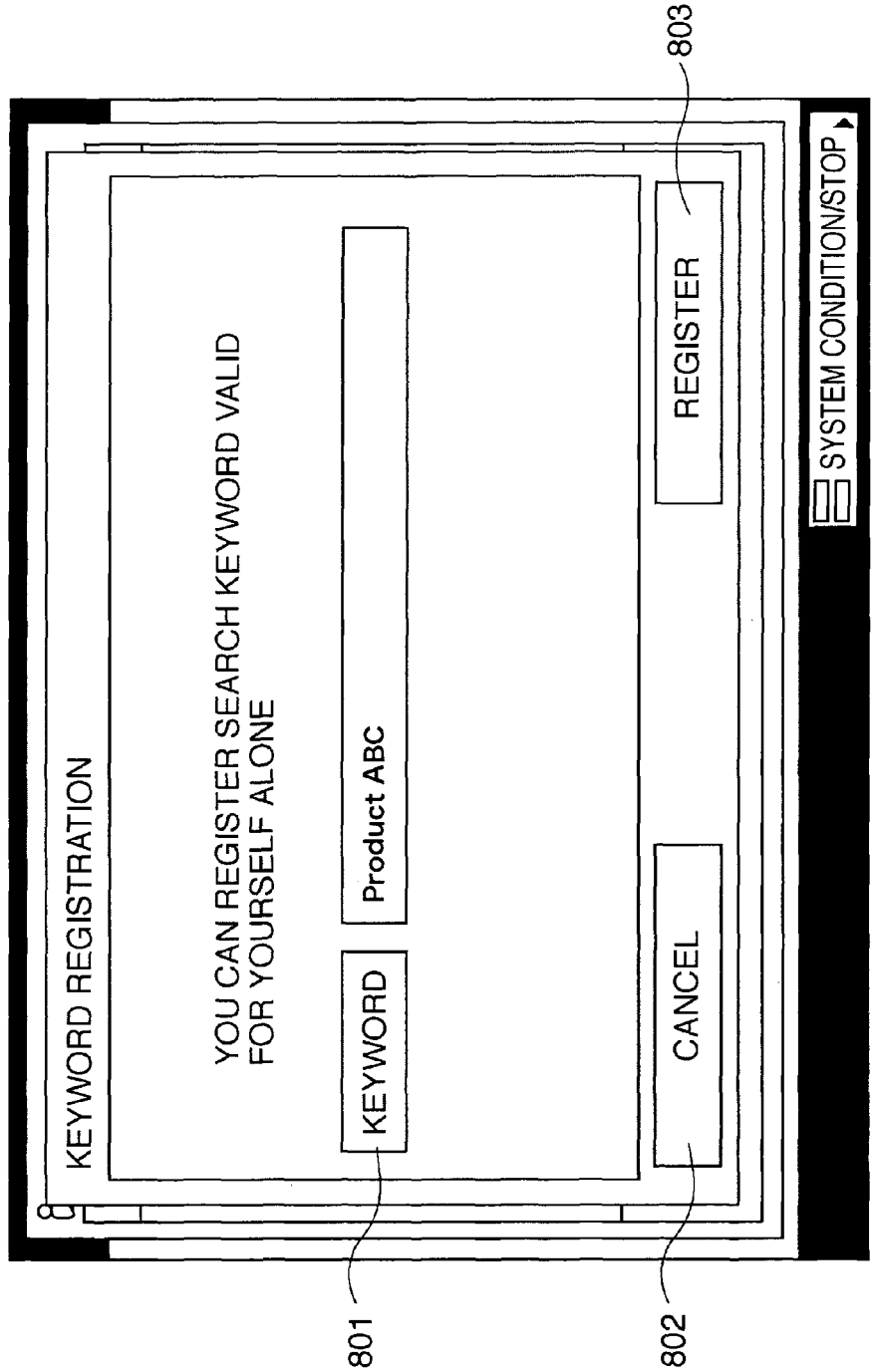
FIG. 8 is a diagram showing an example of a keyword registration screen displayed on the liquid-crystal operation panel section.

FIG. 8 is a diagram showing an example of a keyword registration screen displayed on the liquid-crystal operation panel section 202. The keyword registration screen is displayed when the keyword registration button 705 is depressed on the search result screen shown in FIG. 7.

A registration keyword input label 801 is for indicating a text box 801*a* for entering a keyword (hereinafter also referred to as "a search keyword" as deemed appropriate) to be used for generating an encoded composite keyword, referred to hereinafter, which makes the search keyword valid only for the user when the user searches document data. In the illustrated example, it is assumed that a keyword "Product ABC" is input. A cancel button 802 is for closing the keyword registration screen without performing the keyword registration.

When a registration button 803 is depressed after the keyword is input, a code (encoded composite keyword) is generated from the input keyword and is added to the tags (classification) in the attribute information included in the index information of each document data item selected in advance by the user as an object to be searched for. It should be noted that conventionally, an input keyword has been added without further processing thereon. In this case, when another user happens to add the same keyword to other document data items or there are other document data items having the same classification information as that of the keyword input by the user, such document data items as well become objects to be searched for by a keyword search. This makes it impossible to obtain the same search result that is obtained by a previous search and to which the aforementioned keyword was added. To solve this problem, in the present invention, a unique code for identifying the user is added to the tags in the attribute information included in index information.

Figure 9:
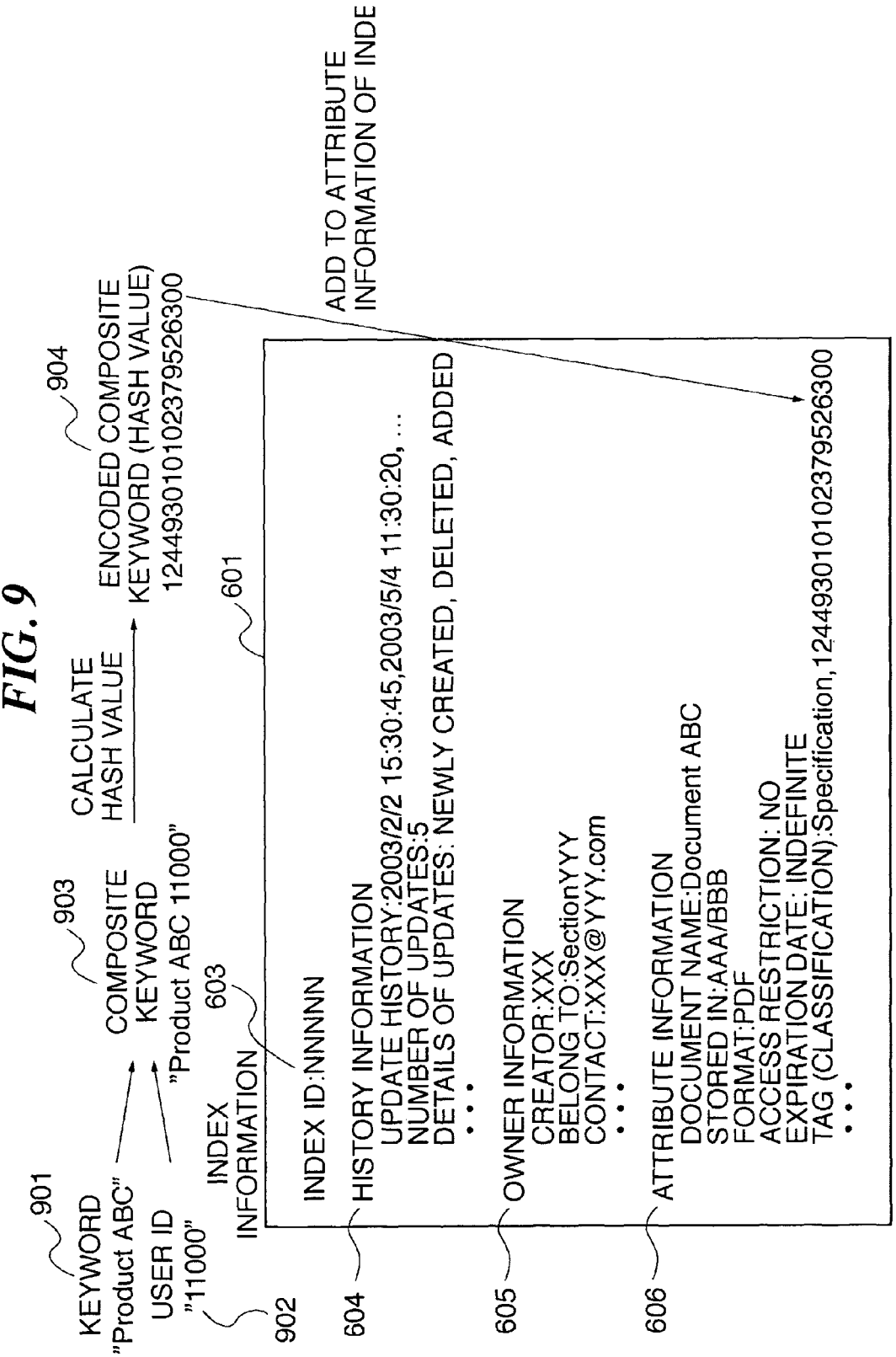
FIG. 9 is a conceptual view of a keyword registration process which is executed by the image processing apparatus shown in FIG. 1.

FIG. 9 is a conceptual view of a keyword registration process executed by the image processing apparatus as the information processing apparatus according to the present embodiment of the present invention. The keyword registration process is executed when the registration button 803 is depressed on the keyword registration screen shown in FIG. 8.

A keyword 901 corresponds to a keyword actually input by the user to the text box 801*a* associated with the registration keyword input label 801 in FIG. 8. A user ID 902 corresponds to a user ID (user information) for identifying the user currently logged in to the image processing apparatus. Normally, the user ID 902 is input together with a password for user authentication and only after the user authentication is successful, the user is permitted to use the image processing apparatus. However, the user ID 902 may be input separately when a keyword is input (registered). Further, when the user logs in to the apparatus, what is required to be input by the user is not limited to the user ID but a user name or the like as well may be input as user information insofar as the input information is formed by a numerical value or a character string which makes it possible to uniquely identify the user.

First, a composite keyword 903 is generated from the keyword 901 and the user ID 902. In the present embodiment, the user ID 902 is added behind the keyword 901 as it is or after it is converted into a character string or numerical value other than that of the keyword 901, whereby the composite keyword 903 is generated. It should be noted that the combining method is not limited to this, but any other suitable combining method may be employed insofar as a composite keyword 903 is generated from the keyword 901 and the user ID 902 by a certain method. After that, a hash value is calculated from the composite keyword 903 to thereby generate an encoded composite keyword 904. By calculating the encoded composite keyword (hash value) 904, it becomes practically impossible to generate another composite keyword having the same hash value. Further, the encoded composite keyword 904 can eliminate a fear that the keyword is known by analysis of index information. Further, the encoded composite keyword 904 can be handled as a simple numerical value, which makes it possible to find document data item(s) quickly.

The generated encoded composite keyword 904 is added to the tags in the attribute information 606 included in the index information 601 of each of the three document data items obtained as the search result. The three document data items mentioned herein refers to "Document ABC", "Image Book", and "Specification F".

In the present embodiment, the hash value of a composite keyword generated by combining character strings is calculated as an encoded composite keyword. However, the method of generating an encoded composite keyword is not limited to this method, but any other suitable encoding method or character string-forming method may be employed insofar as it can generate an encoded composite keyword that can be uniquely identified from both of the keyword 901 and the user ID 902. Further, a method may be employed which simply associates the keyword 901 and the user ID 902, and the associated keyword and user ID is directly added to the index information without generating any code, such as the hash value.

Figure 10:
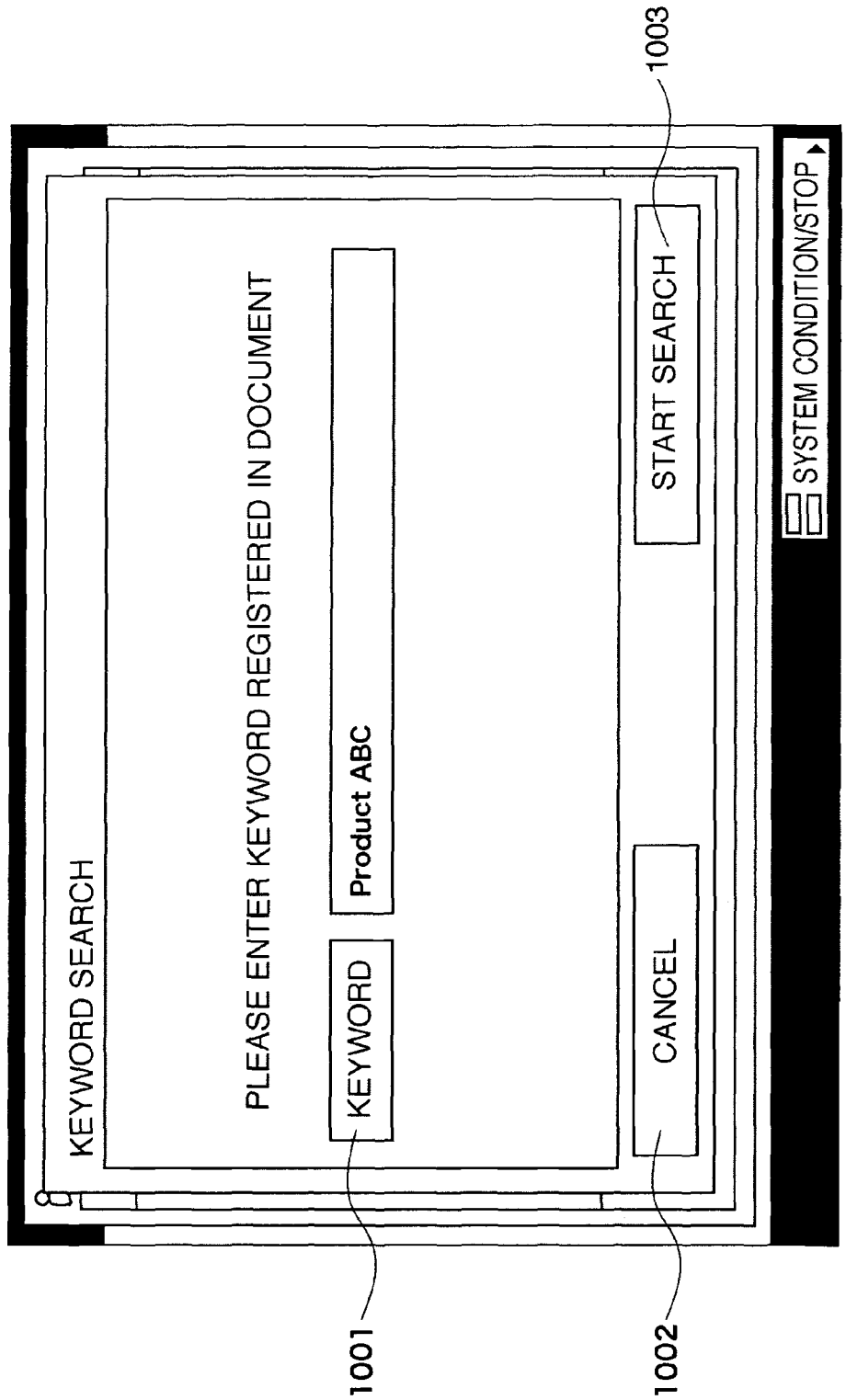
FIG. 10 is a diagram showing an example of a keyword search designation screen displayed on the liquid-crystal operation panel section.

FIG. 10 is a diagram showing an example of a keyword search designation screen displayed on the liquid-crystal operation panel section 202. The keyword search designation screen is displayed when the keyword search button 405 is depressed on the document data list screen an example of which is shown in FIG. 4.

A search keyword entry label 1001 is for indicating a text box 1001*a* for entering a search keyword (registered keyword) from which was generated an encoded composite keyword added to the index information of the document data in the keyword registration process. In FIG. 10, it is assumed that the user has input the keyword "Product ABC" from which the encoded composite keyword was generated, adding the generated encoded composite keyword to the index information of the three document data items obtained as the search result. A cancel button 1002 is for closing the keyword search designation screen without performing the keyword search.

A search start button 1003 is for starting the keyword search based on the input keyword. When the search start button 1003 is depressed, a hash value is calculated by the same method as illustrated in FIG. 9. More specifically, a composite keyword is generated from the input search keyword and the user ID, and a hash value of the composite keyword is calculated to thereby encode the composite keyword into an encoded composite keyword. The generated encoded composite keyword is used for searching for a matching code in the tags in the attribute information 606 included in the index information 601 of each document data item. This makes it possible to obtain the same search result as one shown in FIG. 7.

In the present embodiment, a composite keyword generated by combining a search keyword and a user ID is used, and hence unless a user who added the keyword and a user who performs a search using the keyword are identical, different search results are obtained by respective different users even if the search is made using the same keyword. This makes it possible for a user to always obtain the same search result without being affected by keywords that were added to the index information of document data items by persons other than the user, or tags that were held in advance in the index information of document data items.

Figure 11:
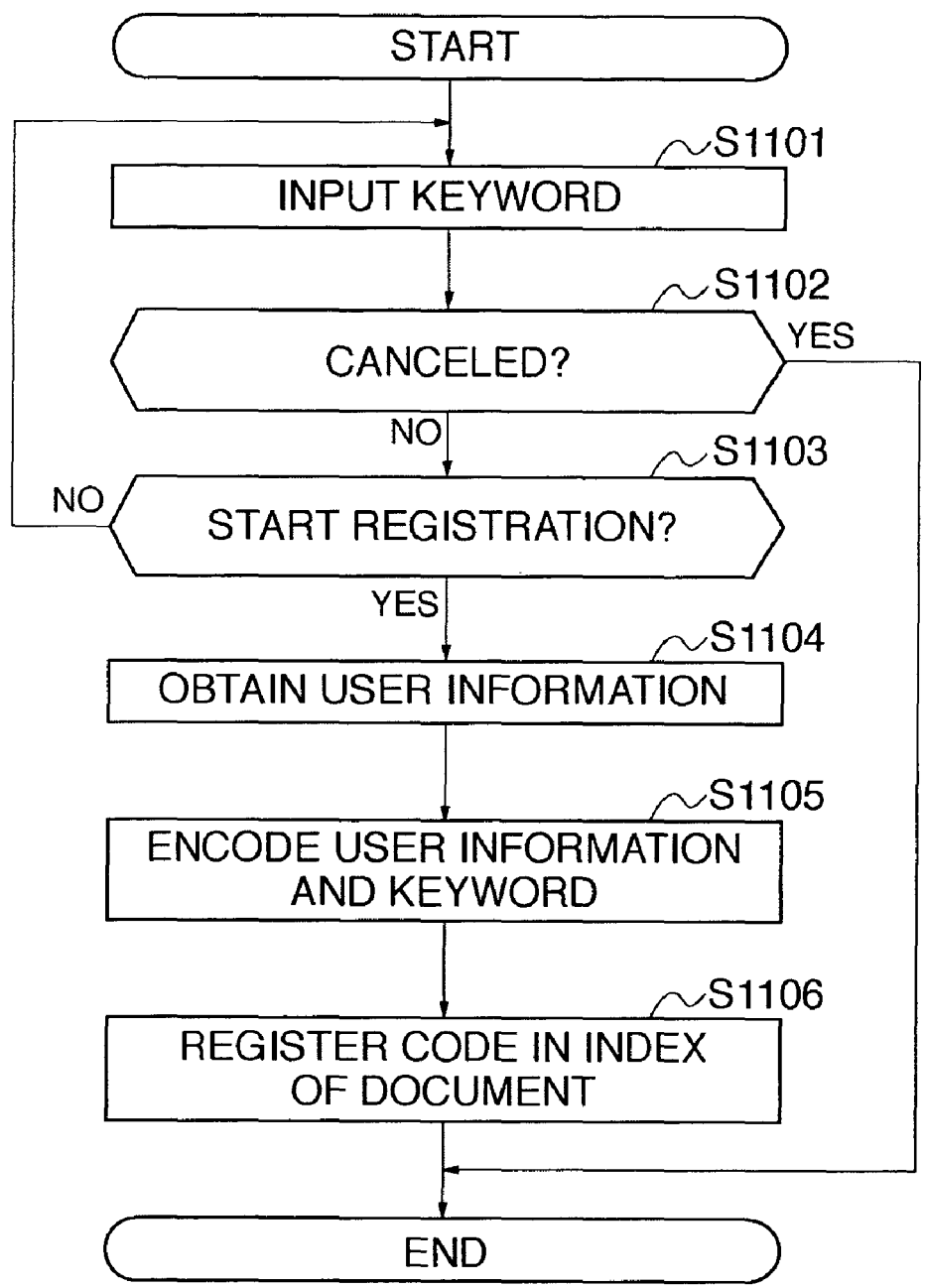
FIG. 11 is a flowchart of a keyword registration process which is executed by the image processing apparatus shown in FIG. 1.

FIG. 11 is a flowchart of the keyword registration process executed by the image processing apparatus as the information processing apparatus according to the first embodiment of the present invention. The keyword registration process is executed when the registration button 803 is depressed on the keyword registration screen shown in FIG. 8. The control of a sequence of operations of this process is executed by the CPU 101 of the controller unit 100 based on a program therefor stored in the HDD 104.

First, in a step S1101, the CPU 101 accepts the entry of a keyword from the user as the keyword is input to the text box 801*a* associated with the registration keyword input label 801, and performs input processing.

In a step S1102, the CPU 101 determines whether or not the cancel button 802 has been depressed. If the cancel button 802 has been depressed, the CPU 101 closes the keyword registration screen without performing the keyword registration, followed by terminating the present process.

In a step S1103, the CPU 101 determines whether or not the registration button 803 has been depressed. If the registration button 803 has not been depressed, the process returns to the step S1101. On the other hand, if the registration button 803 has been depressed, the process proceeds to a step S1104, wherein the CPU 101 obtains user information of the user currently logged in to the image processing apparatus. In the illustrated example, the CPU 101 obtains the user ID of the logged-in user.

Next, in a step S1105, the CPU 101 generates a composite keyword from the obtained user ID and the input keyword, and encodes the thus-generated composite keyword by calculating a hash value thereof to thereby generate an encoded composite keyword. The method of generating the composite keyword and the method of encoding the generated composite keyword are the same as described hereinbefore with reference to FIG. 9 which are employed in generating the encoded composite keyword 904 from the user ID 902 and the keyword 901. It should be noted that the method of generating and encoding a composite keyword is not limited to this, but any other suitable method may be employed insofar as it is capable of uniquely generating an encoded composite keyword from a user ID and a keyword.

In a step S1106, the CPU 101 registers (adds), as a tag, the generated encoded composite keyword in (to) the attribute information 606 included in the index information 601 of each document data item selected in advance by the user, followed by terminating the present process. Although in the step S1106, the document data items to which the encoded composite keyword is to be added are assumed to be the search result obtained by the immediately preceding search, this is not limitative, but they may be selected as desired.

Figure 12:
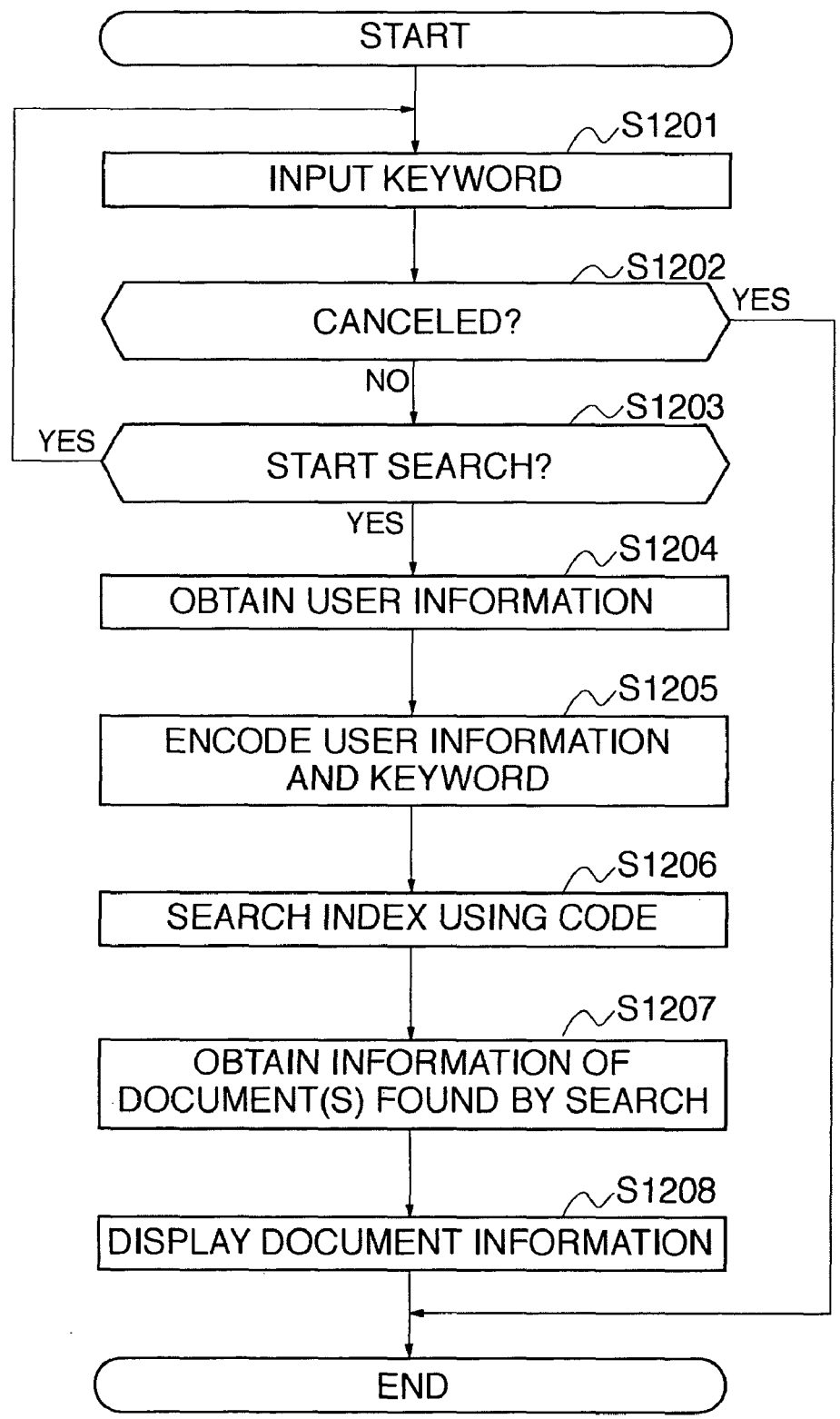
FIG. 12 is a flowchart of a keyword search process which is executed by the image processing apparatus shown in FIG. 1.

FIG. 12 is a flowchart of a keyword search process executed by the image processing apparatus as the information processing apparatus according to the first embodiment of the present invention. The keyword search process is executed when the search start button 1003 is depressed on the keyword search designation screen in FIG. 10. The control of a sequence of operations of this process is executed by the CPU 101 of the controller unit 100 based on a program therefor stored in the HDD 104.

First, in a step S1201, the CPU 101 accepts the entry of a keyword from the user as the keyword is input to the text box 1001a associated with the search keyword entry button 1001, and performs input processing. In a step S1202, the CPU 101 determines whether or not the cancel button 1002 has been depressed. If the cancel button 1002 has been depressed, the CPU 101 closes the keyword search designation screen without performing the keyword search, followed by terminating the present process.

In a step S1203, the CPU 101 determines whether or not the search start button 1003 has been depressed. If the search start button 1003 has not been depressed, the process returns to the step S1201. On the other hand, if the search start button 1003 has been depressed, the process proceeds to a step S1204, wherein the CPU 101 obtains user information of the user currently logged in to the image processing apparatus. In the illustrated example, the CPU 101 obtains the user ID of the logged-in user.

Next, in a step S1205, the CPU 101 generates a composite keyword from the obtained user ID and the input keyword, and encodes the composite keyword by calculating a hash value of the thus-generated composite keyword. This processing is the same as the processing in the step S1105 in FIG. 11.

Next, in a step S1206, the CPU 101 searches index information of the document data items based on the generated encoded composite keyword, to find pieces of index information having a tag matching the encoded composite keyword. Then, in a step S1207, the CPU 101 obtains document information, such as the name, type, size, dates of updates, of a document data item associated with each piece of index information found by the search. Next, in a step S1208, the CPU 101 displays a list of the obtained document information, on the search result screen as shown in FIG. 7.

According to the above-described first embodiment, the input of a keyword from a user is accepted to obtain user information of the logged-in user. Then, a composite keyword is generated from the obtained user ID and the input keyword, and by encoding the thus-generated composite keyword, an encoded composite keyword is generated. Then, the generated encoded composite keyword is added to index information of each of document data items selected in advance by the user. Further, when performing search of the document data, the user information of the logged-in user is obtained. Then, an encoded composite keyword is generated from the obtained user ID and the input keyword, and index information of the document data is searched based on the generated encoded composite keyword. This makes it possible to uniquely find document data items to which the user added the keyword (precisely, the encoded composite keyword generated therefrom), without being affected by keywords added to the document data items by other users. This makes it possible to improve user's convenience in finding the same documents by a search again.

Now, an image processing apparatus as an information processing apparatus according to a second embodiment of the present invention will be described. The image processing apparatus as the information processing apparatus according to the second embodiment has the same basic configuration (FIGS. 1 to 3) as the image processing apparatus as the information processing apparatus according to the first embodiment. Therefore, the following description will be given of only different points from the first embodiment while denoting the same elements by the same reference numerals, and omitting detailed description thereof.

In the above-described first embodiment, when a keyword is registered in index information, an encoded composite keyword is generated by using the user ID of a user currently logged in to the image processing apparatus. In contrast, in the second embodiment, an encoded composite keyword is generated by using a group ID (group information) for identifying an organization or a group to which the user currently logged in to the image processing apparatus belongs.

Figure 13:
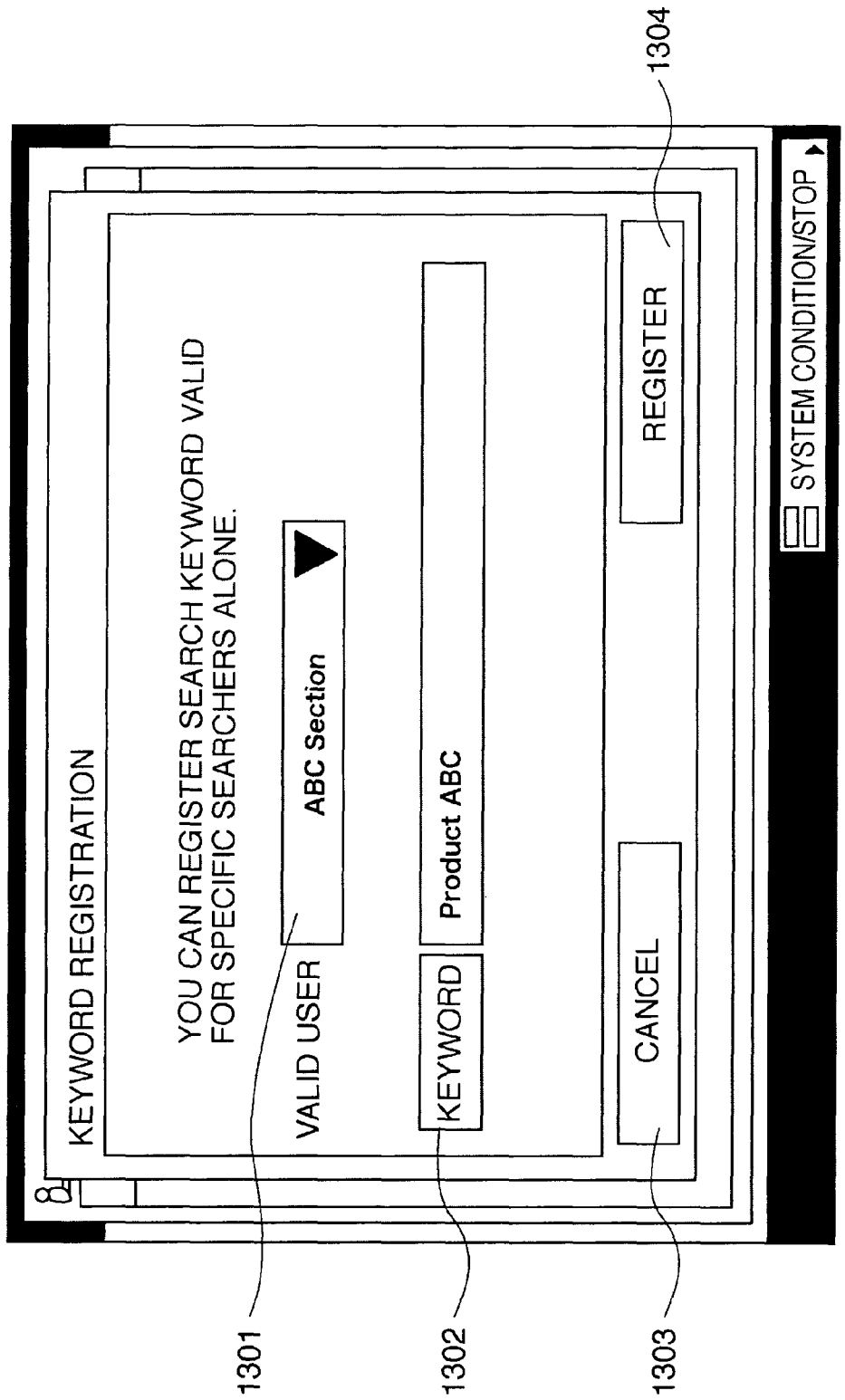
FIG. 13 is a diagram showing an example of a keyword registration screen displayed on a liquid-crystal operation panel section of an operating section of an image processing apparatus as an information processing apparatus according to a second embodiment of the present invention.

FIG. 13 is a diagram showing an example of a keyword registration screen displayed on the liquid-crystal operation panel section 202 of the operating section 140 of the image processing apparatus as the information processing apparatus according to the second embodiment. Similarly to the keyword registration screen shown in FIG. 8 of the above-described first embodiment, the keyword registration screen shown in FIG. 13 is displayed when the keyword registration button 705 is depressed on the search result screen an example of which is shown in FIG. 7.

A valid range designation drop-down list 1301 is for designating whether a search keyword to be registered is valid only for an individual user or for a group or an organization to which the user belongs. When there exist a plurality of groups or organizations to which the user belongs, the user can designate which of the groups (or organizations) the keyword is/are valid for. A registration keyword input label 1302 is for indicating a text box 1302a for entering a search keyword used for generating the encoded composite keyword which makes the search keyword valid only for the user when the user searches the document data or the group(s) or organization(s) to which the user belongs. FIG. 13 illustrates an example of a state in which there is entered a keyword "Product ABC" for generating an encoded composite keyword which makes the keyword "Product ABC" valid only for a group of "ABC Section" to which belongs the user currently logged in to the image processing apparatus. A cancel button 1303 is for closing the keyword registration screen without performing the keyword registration.

When a registration button 1304 is depressed after entry of the keyword, the code (encoded composite keyword) encoded from the keyword by the same method as described above with reference to FIG. 9 is added to the tags of attribute information included in index information of each of document data items that are selected in advance by the user as objects to be searched for.

A composite keyword is generated from a user ID or a group ID designated to indicate the valid range of the keyword via the valid range designation drop-down list 1301 shown in FIG. 13 and the keyword input via the text box 1302a associated with the registration keyword input label 1302, and an encoded composite keyword is generated from the generated composite keyword. In short, if a group or an organization is designated to indicate the valid range, a composite keyword is generated using a group ID for identifying the group or the organization, whereas if only the user is designated to indicate the valid range, a composite keyword is generated using a user ID for identifying the user.

Figure 14:
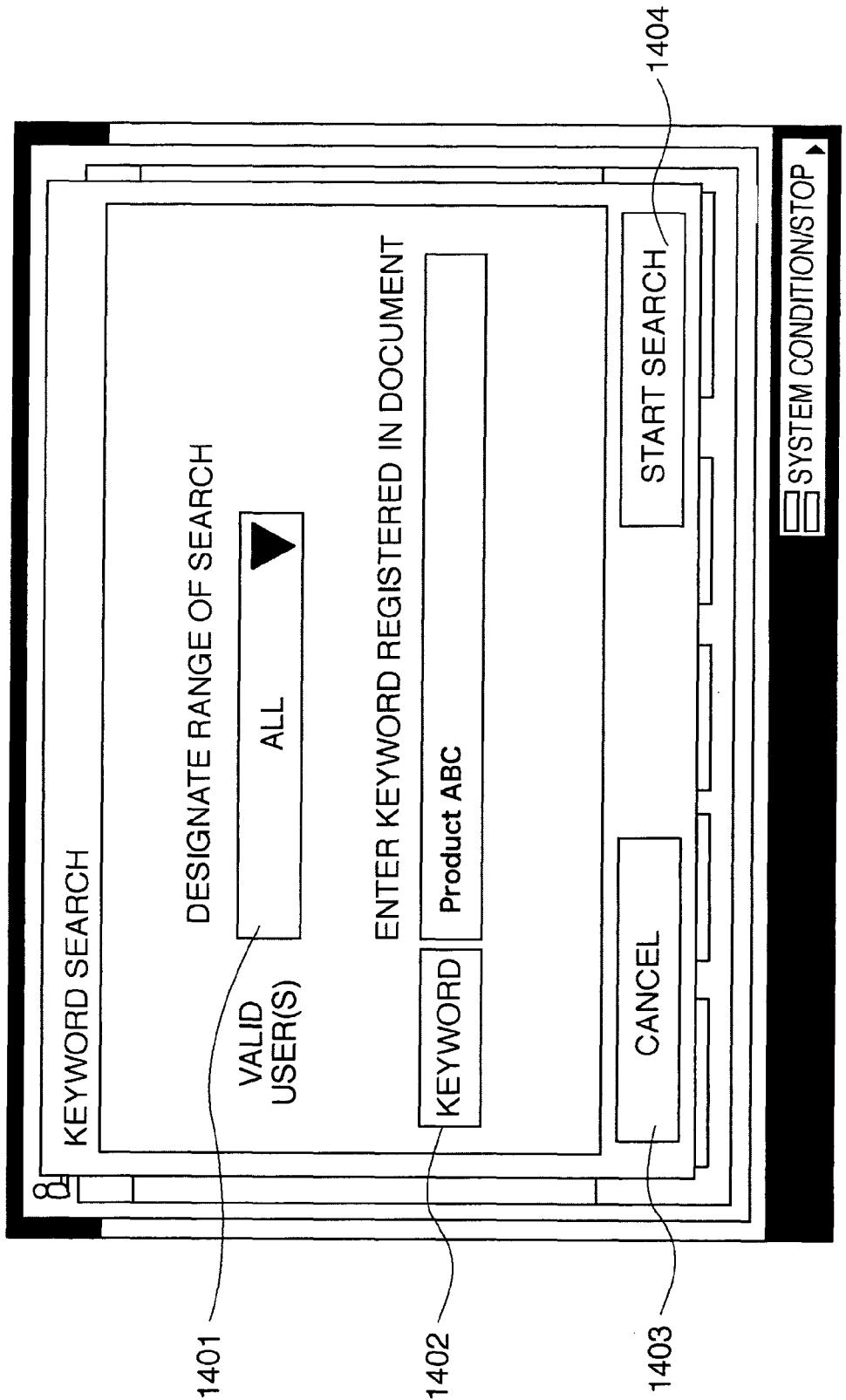
FIG. 14 is a diagram showing an example of a keyword search designation screen displayed on the liquid-crystal operation panel section of the operating section of the image processing apparatus as the information processing apparatus according to the second embodiment of the present invention.

FIG. 14 is a diagram showing an example of a keyword search designation screen displayed on the liquid-crystal operation panel section 202 of the operating section 140 of the image processing apparatus as the information processing apparatus according to the second embodiment of the present invention. Similarly to the keyword search screen in FIG. 10 of the above-described first embodiment, the keyword search designation screen in FIG. 14 is displayed when the keyword search button 405 is depressed on the document data list screen an example of which is shown in FIG. 4.

An valid range designation drop-down list 1401 is for designating the valid range of a keyword used when performing a keyword search. More specifically, the valid range designation drop-down list 1401 designates whether to search for document data items to which is added an encoded composite keyword generated from a keyword of which the valid range covers only an individual user, document data items to which is added an encoded composite keyword generated from a keyword of which the valid range covers only the group(s) or organization(s) to which the user belongs, or all of these document data items. In the present example, document data items to which is added an encoded composite keyword generated from a keyword which is valid only for the group "ABC Section" to which belongs the user performing the keyword search are designated as objects to be searched for.

A search keyword entry button 1402 is for indicating a text box 1402a for entering a search keyword (registered keyword) from which is generated an encoded composite keyword added to the index information of the document data in the keyword registration process. In FIG. 14, it is assumed that the user has input the keyword "Product ABC" which the user has input during registration of the keyword as described hereinabove with reference to FIG. 13 by way of example. A cancel button 1403 is for closing the keyword search designation screen without performing the keyword search.

A search start button 1404 is for starting the keyword search using the input keyword. When the search start button 1404 is depressed, a hash value is calculated by the same method as illustrated in FIG. 9. More specifically, a composite keyword is generated from the input search keyword and a user ID or a group ID designated from the valid range designation drop-down list 1401, and the generated composite keyword is encoded by calculating a hash value thereof to thereby generate an encoded composite keyword. The generated encoded composite keyword is used for searching for a matching code in the tags of the attribute information 606 included in the index information 601 of each document data item. Even if a user who registered the keyword and a user who performs the keyword search are different, this makes it possible for the different users to obtain the same search result insofar as they belong to the group or organization having the same group ID. At this time, even if a user who belongs to another group performs a keyword search using the same keyword, the user cannot obtain the same result, since he/she has a different group ID. In short, a keyword search made by a user who belongs to one group does not affect a keyword search performed by users who belong to other groups. Thus, when the same search result is desired to be shared between users who belong to the same group or organization, it is possible to register a keyword as desired without affecting search results to be obtained for other groups.

Further, it is possible to designate the valid range of a keyword by the valid range designation drop-down list 1401 such that the keyword is valid not to the individual user or the group alone but valid for all of these. In this case, when the search start button 1404 is depressed, first, a composite keyword is generated from the user ID and the input search keyword, and is encoded. Further, a composite keyword is generated from the group ID that identifies the group to which the user belongs and the keyword, and is encoded. Then, there is performed a search for index information which holds a code (encoded composite keyword) that matches either of the two encoded composite keywords. This makes it possible to perform a keyword search in all the valid ranges without concern for the valid range.

Figure 15:
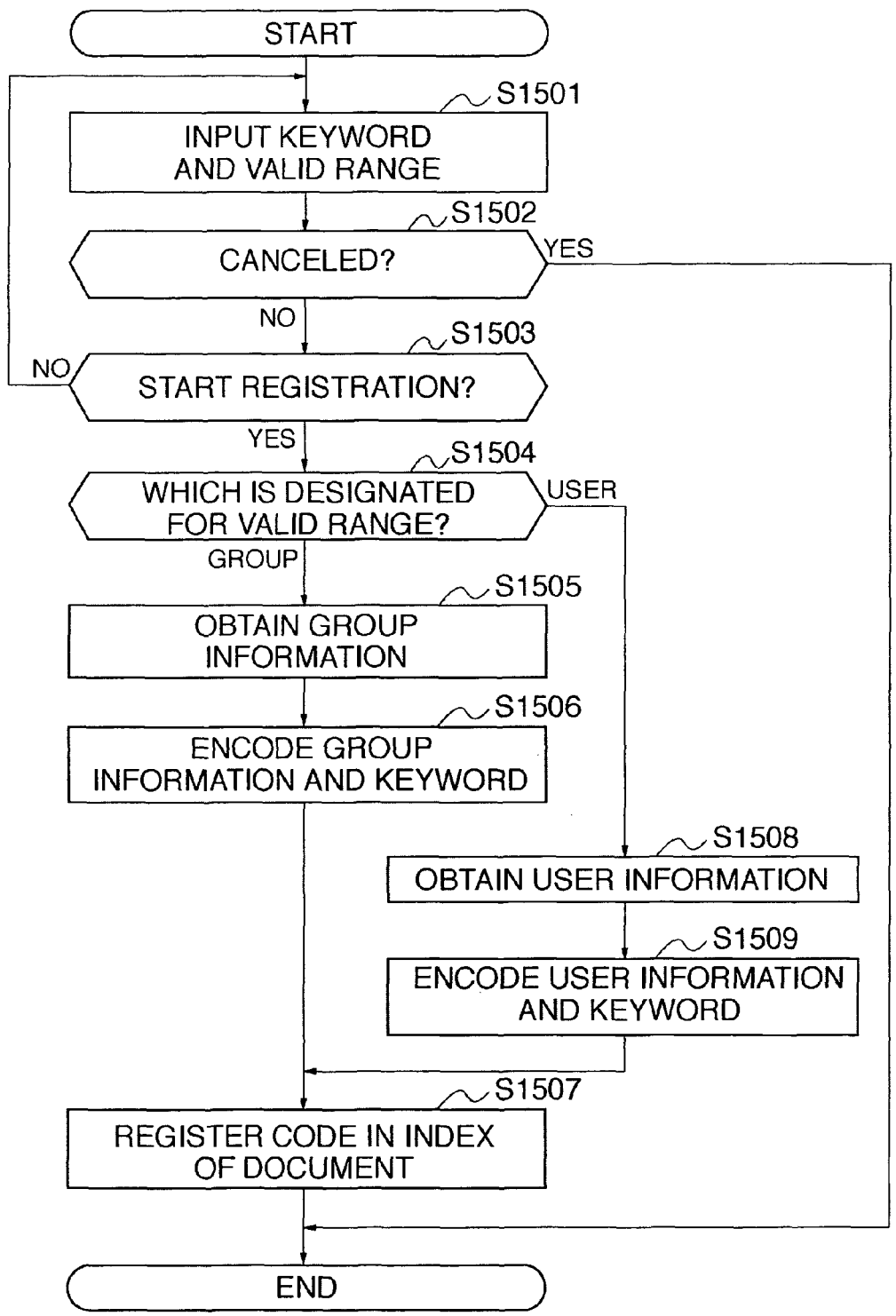
FIG. 15 is a flowchart of a keyword registration process which is executed by the image processing apparatus as the information processing apparatus according to the second embodiment of the present invention.

FIG. 15 is a flowchart of a keyword registration process executed by the image processing apparatus as the information processing apparatus according to the second embodiment of the present invention. The keyword registration process is executed when the registration button 1304 is depressed on the keyword registration screen shown in FIG. 13. The control of a sequence of operations of this process is executed by the CPU 101 of the controller unit 100 based on a program therefor stored in the HDD 104.

First, in a step S1501, the CPU 101 accepts the entry of a keyword from the user as the keyword is input to the text box 1302a associated with the registration keyword input label 1302, and the input of a designated valid range from the valid range designation drop-down list 1301, and performs input processing.

In a step S1502, the CPU 101 determines whether or not the cancel button 1303 has been depressed. If the cancel button 1303 has been depressed, the CPU 101 closes the keyword registration screen without performing the keyword registration, followed by terminating the present process.

If it is not determined in the step S1502 that the cancel button 1303 has been depressed, the process proceeds to a step S1503, wherein the CPU 101 determines whether or not the registration button 1304 has been depressed. If the registration button 1304 has not been depressed, the process returns to the step S1501, whereas if the registration button 1304 has been depressed, the CPU 101 determines which of the valid ranges has been designated (step S1504).

If the CPU 101 determines in the step S1504 that the user has designated only the group(s) or the organization(s) as the valid range of the input keyword, the process proceeds to a step S1505, wherein the CPU 101 obtains group information of the user currently logged in to the image processing apparatus. In the present example, the CPU 101 obtains the group ID e.g. of each organization or group to which the currently logged-in user belongs. It should be noted that when the user belongs to a plurality of groups, the group ID of a group or each of groups designated by the user is obtained.

Then, the process proceeds to a step S1506, wherein the CPU 101 generates a composite keyword from the obtained group ID and the keyword, and encodes the composite keyword by calculating a hash value of the thus-generated composite keyword, to thereby generate an encoded composite keyword. Then, the process proceeds to a step S1507.

In the step S1507, the CPU 101 registers (adds) the encoded composite keyword in the attribute information 606, which is included in the index information 601 of each of document data items selected in advance by the user, as a tag, followed by terminating the present process. It should be noted that although in the step S1507, the document data items to which the encoded composite keyword is added are obtained as the search result of the immediately preceding search executed by the user, this is not limitative, but the document data items may be selected as desired.

If the CPU 101 determines in the step S1504 that the user has designated only the individual user as the valid range of the input keyword, the process proceeds to a step S1508, wherein the CPU 101 obtains the user information (user ID, in the present example) of the user currently logged in to the apparatus. Then, in a step S1509, the CPU 101 generates a composite keyword from the obtained user ID and the keyword, and encodes the thus-generated composite keyword to thereby generate an encoded composite keyword. Then, the CPU 101 executes the steps S1507 et seq.

Figure 16:
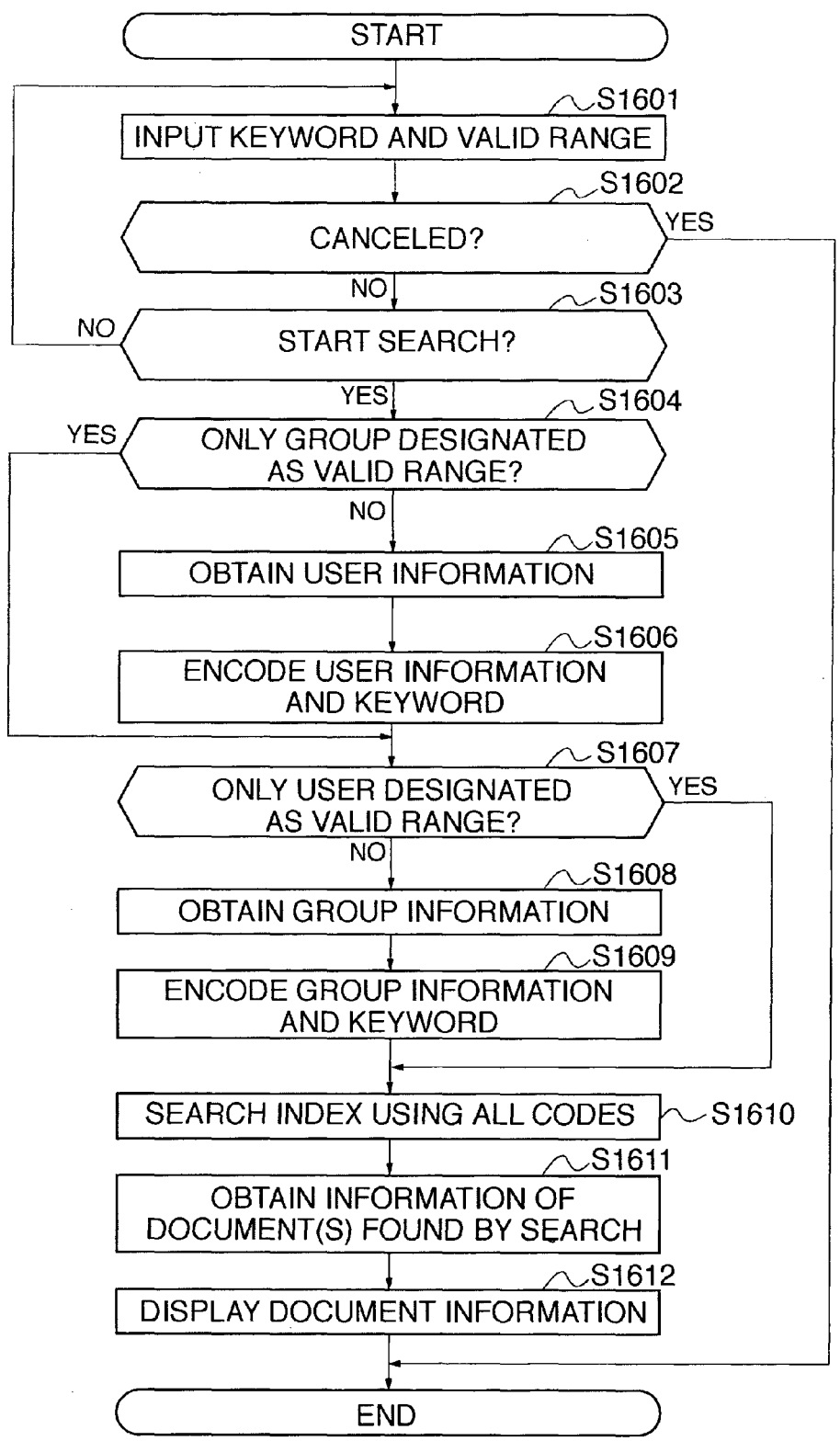
FIG. 16 is a flowchart of a keyword search process which is executed by the mage processing apparatus as the information processing apparatus according to the second embodiment of the present invention.

FIG. 16 is a flowchart of a keyword search process executed by the image processing apparatus as the information processing apparatus according to the second embodiment of the present invention. The keyword search process is executed when the search start button 1404 is depressed on the keyword search designation screen shown in FIG. 14. The control of a sequence of operations of this process is executed by the CPU 101 of the controller unit 100 based on a program therefor stored in the HDD 104.

First, in a step S1601, the CPU 101 accepts the entry of a keyword from the user as the keyword is input to the text box 1402a associated with the search keyword input label 1402, and the input of a designated valid range from the valid range designation drop-down list 1401, and performs input processing.

In a step S1602, the CPU 101 determines whether or not the cancel button 1403 has been depressed. If the cancel button 1403 has been depressed, the CPU 101 closes the keyword search designation screen without performing the keyword search, followed by terminating the present process.

If it is not determined in the step S1602 that the cancel button 1403 has been depressed, the process proceeds to a step S1603, wherein the CPU 101 determines whether or not the search start button 1404 has been depressed. If the search start button 1404 has not been depressed, the process returns to the step S1601, whereas if the search start button 1404 has been depressed, the CPU 101 determines whether or not the valid range designated by the user covers only a group or groups (step S1604). If the CPU 101 determines that the valid range designated by the user covers only a group or groups, the process proceeds to a step S1607.

On the other hand, if the CPU 101 does not determine in the step S1604 that the valid range designated by the user covers only the group or groups, the process proceeds to a step S1605, wherein the CPU 101 obtains the user information (user ID, in the present example) of the user currently logged in to the apparatus. Then, in a step S1606, the CPU 101 generates a composite keyword from the obtained user information and the input keyword, and encodes the thus-generated composite keyword to thereby generate an encoded composite keyword, followed by the process proceeding to the step S1607.

Next, in the step S1607, the CPU 101 determines whether or not the valid range designated by the user covers only the user. If the CPU 101 determines that the designated valid range covers only the user, the process proceeds to a step S1610, whereas if the CPU 101 does not determine that the designated valid range covers only the user, the process proceeds to a step S1608, wherein the CPU 101 obtains the group information (group ID, in the present example) of the user currently logged in to the apparatus is obtained. If the user belongs to a plurality of groups, the CPU 101 obtains the group ID of a group or each of groups designated by the user. Then, in a step S1509, the CPU 101 generates a composite keyword from the obtained group ID and the keyword, and encodes the thus-generated composite keyword(s) to thereby generate an encoded composite keyword or encoded composite keywords.

In the step S1610, the CPU 101 searches for index information having a tag matching any of all the codes (encoded composite keywords) generated in the steps S1606 and S1609. Then, in a step S1611, the CPU 101 obtains document information, such as the name, type, size, dates of updates, of each of document data items associated with respective items of the index information found by the search. Next, in a step S1612, the CPU 101 displays a list of the obtained document information on the search result screen as shown in FIG. 7.

According to the above-described second embodiment, the CPU 101 accepts the input of a keyword and the input of a designated valid range, from the user. When the designated valid range covers a group or an organization, group information of the logged-in user is obtained. Then, a composite keyword is generated from the obtained group information and the input keyword, and the thus-generated composite keyword is encoded to generate an encoded composite keyword. Next, the generated encoded composite keyword is added to index information of each of document data items selected in advance by the user. On the other hand, when the valid range designated by the user covers only the user, an encoded composite keyword is generated from the obtained user information and the keyword, and is added to the index information.

Although in the above-described first and second embodiments, the description has been given of a case where document image data items and associated index information items, which constitute respective document data items, are stored in the HDD 104, this is not limitative, but document image data items and associated index information items may be separately stored.

Further, when performing a keyword search, an encoded composite keyword or encoded composite keywords is/are generated from user information and/or group information and a keyword, depending on a valid range designated by a user, and the index information of the document data items is searched based on the generated encoded composite keyword (s). This makes it possible to uniquely search for a document or documents by a keyword added by a user of the same group without being affected by a keyword added by another group or user, which makes it possible to improve the convenience of sharing the document within the group.

It is to be understood that the present invention may also be accomplished by supplying a system or an apparatus with a storage medium in which a program code of software, which realizes the functions of either of the above described embodiments, is stored, and causing a computer (or CPU or MPU) of the system or apparatus to read out and execute the program code stored in the storage medium.

In this case, the program code itself read from the storage medium realizes the functions of either of the above described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions either of the above described embodiments may be accomplished not only by executing the program code read out by a computer, but also by causing an OS (operating system) or the like which operates on the computer to perform a part or all of the actual operations based on instructions of the program code.

Further, it is to be understood that the functions either of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

INDUSTRIAL APPLICABILITY

By applying the present invention to a document search system comprising a document database, and an information processing apparatus, such as an image processing apparatus including a multifunction peripheral, and a personal computer, it is possible to improve user's convenience in searching for documents found by a previous search again.

What is claimed is:

1. An information processing apparatus comprising:
   a controller device comprising a data processing device;
   an input unit configured to input a plurality of new search keys, each new search key to be registered with a file for subsequent retrieval of the file based on a comparison involving the respective new search key, when registered, and a subsequently input search key that is input after registration of the respective new search key;
   a user information obtaining unit configured to, for each of the plurality of new search keys, obtain user information for identifying a user to be associated with the respective new search key;
   a group information obtaining unit configured to, for each of the plurality of new search keys, obtain group information for identifying a user group to be associated with the respective new search key;
   an addition unit configured to, for each of the plurality of new search keys, (a) form a composite search keyword from the respective new search key and the user information obtained by the user information obtaining unit or the group information obtained by the group information obtaining unit, and (b) add the composite search keyword to index information associated with the file for the subsequent retrieval of the file;
   a selection unit configured to select, for each of the plurality of new search keys and for the forming and adding performed by the addition unit, either the user information or the group information; and
   a registration unit configured to cause the index information, having the composite search keywords formed by the addition unit and added thereto by the addition unit according to the selection by the selection unit, to be registered with the file in a storage unit for the subsequent retrieval of the file,
   wherein each of the units is implemented at least in part by the controller device.

2. An information processing apparatus as claimed in claim 1, further comprising a second selection unit configured to select the file from a plurality of files stored in the storage unit, wherein the addition unit is configured to add the composite search keywords to the index information associated with the file selected by the second selection unit.

3. An information processing apparatus as claimed in claim 1, further comprising a search unit configured to search files stored in the storage unit, based at least on a comparison of (a) each of at least some of the composite search keywords registered by the registration unit with (b) the subsequently input search key that is input after the registration of at least the each of at least some of the composite search keywords by the registration unit.

4. An information processing apparatus as claimed in claim 1, further comprising an encoding unit configured to, for each of at least some of the new search keys, cause the respective composite search keyword to be in an encoded form for the registration performed by the registration unit.

5. An information processing apparatus as claimed in claim 2, wherein the second selection unit is configured to select the file according to an instruction from the user.

6. An information processing apparatus as claimed in claim 2, wherein the second selection unit is configured to select the file by searching at least some of the plurality of files stored in the storage unit under search conditions designated by the user.

7. An information processing apparatus as claimed in claim 1, wherein the selection unit is configured to select either the user information or the group information according to user instruction.

8. A file management method comprising:
   an input step of inputting a plurality of new search keys, each new search key to be registered with a file for subsequent retrieval of the file based on a comparison involving the respective new search key, when registered, and a subsequently input search key that is input after registration of the respective new search key;
   a user information obtaining step of, for each of the plurality of new search keys, obtaining user information for identifying a user to be associated with the respective new search key;
   a group information obtaining step of, for each of the plurality of new search keys, obtaining group information for identifying a user group to be associated with the respective new search key;
   an addition step of, for each of the plurality of new search keys, (a) forming a composite search keyword from the respective new search key and the user information obtained in the user information obtaining step or the group information obtained by the group information obtaining step, and (b) adding the composite search keyword to index information associated with the file for the subsequent retrieval of the file;
   a selection step of selecting, for each of the plurality of new search keys and for the forming and adding performed in the addition step, either the user information or the group information; and
   a registration step of causing the index information, having the composite search keywords formed in the addition step and added thereto in the addition step according to the selection in the selection step, to be registered with the file in a storage unit for the subsequent retrieval of the file,
   wherein each of the steps is executed at least in part by a controller device of an information processing apparatus, the controller device comprising a data processing device.

9. A file management method as claimed in claim 8, further comprising a second selection step of selecting the file from a plurality of files stored in the storage unit, wherein the addition step includes adding the composite search keywords to the index information associated with the file selected in the second selection step.

10. A file management method as claimed in claim 8, further comprising a search step of searching files stored in the storage unit, based at least on a comparison of (a) each of at least some of the composite search keywords registered in the registration step with (b) the subsequently input search key that is input after the registration of at least the each of at least some of the composite search keywords in the registration step.

11. A file management method as claimed in claim 8, further comprising an encoding step of, for each of at least some of the new search keys, cause the respective composite search keyword to be in an encoded form for the registration performed in the registration step.

12. A file management method as claimed in claim 9, wherein the second selection step includes selecting the file to which the search key should be added, according to an instruction from the user.

13. A file management method as claimed in claim 9, wherein the second selection step includes selecting the file by searching at least some of the plurality of files stored in said storage unit under search conditions designated by the user.

14. A file management method as claimed in claim 8, wherein, in the selection step, selecting either the user information or the group information is performed according to user instruction.

15. A non-transitory computer-readable storage medium storing a program for causing a computer to execute a file management method, wherein the file management method comprises:

an input step of inputting a plurality of new search keys, each new search key to be registered with a file for subsequent retrieval of the file based on a comparison involving the respective new search key, when registered, and a subsequently input search key that is input after registration of the respective new search key;

a user information obtaining step of, for each of the plurality of new search keys, obtaining user information for identifying a user to be associated with the respective new search key;

a group information obtaining step of, for each of the plurality of new search keys, obtaining group information for identifying a user group to be associated with the respective new search key;

an addition step of, for each of the plurality of new search keys, (a) forming a composite search keyword from the respective new search key and the user information obtained in the user information obtaining step or the group information obtained by the group information obtaining step, and (b) adding the composite search keyword to index information associated with the file for the subsequent retrieval of the file;

a selection step of selecting, for each of the plurality of new search keys and for the forming and adding performed in the addition step, either the user information or the group information; and a registration step of causing the index information, having the composite search keywords formed in the addition step and added thereto in the addition step according to the selection in the selection step, to be registered with the file in a storage unit for the subsequent retrieval of the file.

* * * * *